(12) United States Patent
Li et al.

(10) Patent No.: US 12,055,523 B1
(45) Date of Patent: Aug. 6, 2024

(54) ROCK PHYSICO-MECHANICAL TESTING SYSTEM IN SIMULATED ENVIRONMENTS OF DEEP EARTH, DEEP SPACE, AND DEEP SEA

(71) Applicant: SHENZHEN UNIVERSITY, Shenzhen (CN)

(72) Inventors: Minghui Li, Shenzhen (CN); Heping Xie, Shenzhen (CN); Cunbao Li, Shenzhen (CN); Mingzhong Gao, Shenzhen (CN); Jun Lu, Shenzhen (CN); Cancan Chen, Shenzhen (CN); Zhouqian Wu, Shenzhen (CN); Delei Shang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 18/589,992

(22) Filed: Feb. 28, 2024

(30) Foreign Application Priority Data

Mar. 2, 2023 (CN) .......................... 202310192091.2

(51) Int. Cl.
*G01N 3/08* (2006.01)
(52) U.S. Cl.
CPC ....... *G01N 3/08* (2013.01); *G01N 2203/0226* (2013.01); *G01N 2203/0256* (2013.01)
(58) Field of Classification Search
CPC ............. G01N 3/08; G01N 2203/0226; G01N 2203/0256
See application file for complete search history.

(56) References Cited

U.S. PATENT DOCUMENTS

| | | | | |
|---|---|---|---|---|
| 4,502,338 A | * | 3/1985 | Smith ...................... | G01N 3/08 73/826 |
| 4,715,212 A | * | 12/1987 | Johanson ................. | G01N 3/08 73/794 |
| 9,921,202 B2 | * | 3/2018 | Huang ..................... | G01L 15/00 |
| 11,047,782 B1 | * | 6/2021 | Zheng ...................... | G01N 3/04 |
| 11,047,789 B2 | * | 6/2021 | Guo ................... | G01N 15/0806 |
| 11,287,356 B1 | * | 3/2022 | Guo .......................... | G01N 3/10 |

(Continued)

FOREIGN PATENT DOCUMENTS

CN 102735548 B 10/2012

*Primary Examiner* — Freddie Kirkland, III
(74) *Attorney, Agent, or Firm* — Jeenam Park

(57) ABSTRACT

The application relates to a rock physico-mechanical testing system in simulated environments of deep earth, deep space, and deep sea, which comprises a three-axis six-direction loading system and an experimental cabin, wherein the three-axis six-direction loading system comprises a loading frame and 6 actuators; an experimental cabin accommodation chamber is arranged in the loading frame, the experimental cabin accommodation chamber is provided with 6 loading ports, and six actuators are each adapted to one of the loading ports; the experimental cabin comprises a cabin body and 6 butting indenters, wherein the 6 butting indenters are respectively arranged in through holes of the cabin body in six directions and can axially move relative to the cabin body; and front ends of the six actuators are each operatively butted with a rear end of one of the butting indenters. The application can be used to achieve the reservoir rock mechanical behavior testing.

11 Claims, 25 Drawing Sheets

(56) References Cited

U.S. PATENT DOCUMENTS

| | | | |
|---|---|---|---|
| 11,885,186 B2 * | 1/2024 | Li | E21B 21/08 |
| 11,982,649 B1 * | 5/2024 | Liu | G01N 3/16 |
| 2023/0408390 A1 * | 12/2023 | Gao | G01N 3/18 |

* cited by examiner

ROCK PHYSICO-MECHANICAL TESTING SYSTEM IN SIMULATED ENVIRONMENTS OF DEEP EARTH, DEEP SPACE, AND DEEP SEA

CROSS-REFERENCE TO RELATED APPLICATIONS

This application claims priority to Chinese Patent Application No. 202310192091.2, filed on Mar. 2, 2023, which is hereby incorporated by reference in its entirety.

TECHNICAL FIELD

The present invention relates to the technical field of rock mechanical behavior testing, and in particular, to a rock physico-mechanical testing system in simulated environments of deep earth, deep space, and deep sea.

BACKGROUND

China is in the stage of accelerating industrialization and urbanization, and the demand for resources is increasing day by day. The resources in the shallow parts of the earth have gradually been depleted. The deep earth, deep space and deep sea areas contain a large amount of resources and energy, and therefore, the demand for resources and energy is gradually shifting to the deep at present. Due to the unknown and lack of scientific theories in the deep earth, deep space and deep sea areas, the implementation of related projects faces huge challenges. For the extraction and utilization of deep earth resources, an extraction environment faces "high stress, high ground temperature, high osmotic pressure" and more severe engineering disturbances, which makes the development of deep resources difficult and costly. Moreover, the disaster accidents are high in frequency, large in magnitude, and difficult to predict, which seriously affects the safe and efficient extraction of deep resources. Therefore, the development of related deep rock physico-mechanical tests has great theoretical, engineering and strategic significance. At present, relevant theories and technologies for the exploration and development of conventional resources in the shallow part of the earth crust are mature; however, theories and technologies for the development and utilization of deep earth, deep space and deep sea resources are lacked, and establishment of theories and technical systems is inseparable from a matched physico-mechanical experiment system.

For the projects of mining of deep mineral resources, geological storage of carbon dioxide, underground space development and geothermal development, the stress environment is a true triaxial stress state due to the effects of tectonic stress, mining disturbance, occurrence environment, formation stress, reservoir water environment and the like, and particularly after the deep areas are reached, the stress has the characteristic of high pressure. An experimental system capable of performing multi-physical field, multi-scale and three-dimensional multi-parameter real-time synchronous monitoring under complex environmental conditions such as great temperature difference, high pressure, high vacuum degree and high osmotic pressure is lacked.

At present, the experimental study of the rock mechanical behavior in deep earth, deep space, and deep sea areas is usually performed under uniaxial stress and axial-confining pressure, which obviously has a larger difference from the actual engineering stress. In addition, most of the existing true triaxial physico-mechanical test loading systems are in a single, fixed and closed design, and a loading system cannot be butted with test cavities with different functions, resulting in limited experimental type that can be performed by an experimental system.

SUMMARY

To resolve the foregoing technical problem, the present application provides a rock physico-mechanical testing system in simulated environments of deep earth, deep space, and deep sea.

The present application is implemented by the following technical solutions.

The rock physico-mechanical testing system in simulated environments of deep earth, deep space, and deep sea provided by the present application comprises a three-axis six-direction loading system and an experimental cabin, wherein the three-axis six-direction loading system comprises a loading frame and a true triaxial stress loading mechanism, and the true triaxial stress loading mechanism comprises two horizontal actuators in an X-axis direction, two horizontal actuators in a Y-axis direction and two vertical actuators in a Z-axis direction;

the loading frame is internally provided with an experimental cabin accommodation chamber, the experimental cabin accommodation chamber is provided with a loading port in each of upper, lower, left, right, front and rear directions, the loading port is communicated with the experimental cabin accommodation chamber, and the six actuators are each adapted to one of the loading ports;

the experimental cabin comprises a cabin body and 6 butting indenters, the 6 butting indenters are pairwise located in an X-axis direction, a Y-axis direction and a Z-axis direction, the 6 butting indenters are respectively mounted in through holes of the cabin body in six directions and can move axially relative to the cabin body, inner ends of the butting indenters extend into the cabin body, and the outer ends of the butting indenters are exposed out of the cabin body; and the experimental cabin is operatively placed in the experimental cabin accommodation chamber, and front ends of the six actuators each are operatively butted with a rear end of one of the butting indenters.

Optionally, the three-axis six-direction loading system further comprises a beam assembly and a beam moving mechanism, wherein the beam assembly comprises a moving beam, a plurality of vertically arranged bearing columns and a beam locking mechanism; a moving beam is mounted on the plurality of bearing columns, the beam moving mechanism is configured to achieve an up-and-down movement of the moving beam along the plurality of bearing columns, the beam locking mechanism may fix the moving beam and the plurality of bearing columns, and the upper vertical actuator is mounted in a center of the moving beam;

the loading frame comprises an integrally-manufactured loading frame beam, a lower end of a bearing column is fixedly connected to the loading frame beam, the experimental cabin accommodation chamber is arranged in a center of the loading frame beam, and 6 loading ports are respectively located on six faces of the loading frame beam; the lower vertical actuator and the 4 horizontal actuators are separately mounted on the loading frame beam; and the beam moving mechanism comprises a plurality of lift hydraulic cylinders supported between the moving beam and the loading frame beam.

Optionally, 4 bearing columns are provided, four clamping openings adapted to the bearing columns are formed in the moving beam, and the bearing columns are mounted in the clamping openings;

the beam locking mechanism comprises two sets of clamping hydraulic cylinders, an extended clamping arm is arranged outside each clamping opening, the clamping arms and the moving beam are integrally manufactured, and the clamping arms of every two clamping openings are tensioned through one set of clamping hydraulic cylinders so as to simultaneously clamp and fix two corresponding bearing columns and the moving beam.

Particularly, the cabin body comprises an outer cubic frame and 6 wall plates, and the 6 wall plates are respectively mounted in 6 directions of the outer cubic frame; an outer side of each wall plate is provided with an elastic plate, two ends of the elastic plate are movably connected to the outer cubic frame, coaxial through holes are formed in the elastic plate and the wall plate, and the butting indenters are mounted in the through holes and fixedly connected to the elastic plate.

Particularly, electric heating elements are mounted on all 6 wall plates.

Optionally, a heating plate is mounted at a front end of at least one of the butting indenters, and an electric heating element is mounted in the heating plate.

Particularly, the rock physico-mechanical testing system in simulated environments of deep earth, deep space, and deep sea further comprises an elastic pressure box, wherein the elastic pressure box comprises 6 indenters, and the 6 indenters are pairwise located in an X-axis direction, a Y-axis direction and a Z-axis direction; the 6 indenters are connected together by at least 8 elastic pieces to form a space for placing a sample inside; the elastic pressure box is operatively placed in the cabin body, and front ends of the 6 butting indenters are each butted with a rear end of one of the indenters;

a displacement detection mechanism is arranged or not arranged between the two indenters in the same axial direction; the front end of the indenter is provided with or without a temperature sensor and/or a heat flow sensor; and the front end of the indenter is provided with or without an acoustic emission probe and/or an ultrasonic probe.

Particularly, the indenter comprises an indenter body and a permeation block, wherein a front end of the indenter body is provided with an annular sealing groove and a rectangular convex block, the annular sealing groove is located at an edge of the front end of the indenter body, the rectangular convex block is located on an inner periphery of the annular sealing groove, and a circumferential sealing strip is embedded in the annular sealing groove;

a percolation medium channel and a sealing medium injection channel are arranged in the indenter body, one end of the sealing medium injection channel is communicated with the annular sealing groove, and the other end of the sealing medium injection channel passes through an outer surface of the indenter body; and a front end face of the rectangular convex block is provided with an integrally-manufactured embedding groove, the permeation block is embedded in the embedding groove, a plurality of permeation holes are uniformly distributed in the permeation block, the permeation holes are communicated with the permeation block from front to back, one end of the percolation medium channel is communicated with the embedding groove, and the other end of the percolation medium channel is communicated with the outer surface of the indenter body.

Particularly, the rock physico-mechanical testing system in simulated environments of deep earth, deep space, and deep sea further comprises a sample holder, wherein the sample holder comprises a rigid outer cubic frame and a flexible inner cubic frame, the rigid outer cubic frame and the flexible inner cubic frame are both provided with 12 frame edges, 6 faces of the rigid outer cubic frame and 6 faces of the flexible inner cubic frame are both rectangular frames, and 12 outside corner positions of the flexible inner cubic frame are attached to 12 inside corners of the rigid outer cubic frame;

each face of the flexible inner cubic frame is provided with an integrally-manufactured annular flange, wherein the annular flange is adapted to an annular groove of the circumferential sealing strip; and the sample may be loaded in the flexible inner cubic frame, 6 indenters operatively and respectively pass through frame openings of the rigid outer cubic frame and the flexible inner cubic frame in 6 directions, and annular flanges on 6 faces of the flexible inner cubic frame are correspondingly loaded in annular grooves of circumferential sealing strips of the 6 indenters.

Optionally, the cabin body is provided with an air inlet, an air outlet and a cold source port; and optionally, a heating plate is mounted at a front end of at least one of the butting indenters.

Optionally, the vertical actuator and the horizontal actuator both comprise a cylinder barrel, a piston and an actuating indenter, the actuating indenter is connected to a free end of the piston, and the actuating indenter is adapted to the butting indenter; and a first displacement sensor is arranged between the cylinder barrel and the piston, and a force sensor is arranged between the actuating indenter and the piston.

Compared with the prior art, the present application has the following beneficial effects:

1. the three-axis six-direction loading system according to the present application is in an open design, and a loading frame can be used to place experimental cabins with different functions and can be butted with experimental cabin bodies with different functions;

2. the cabin body of the experimental cabin according to the present application may be butted with a three-axis six-direction stress loading system and can also be butted with the elastic pressure box; the cabin body can transfer a force of the loading system to the sample, and provide a high-temperature environment for the sample, which can achieve the testing of reservoir rock mechanical behavior in real-time environments;

3. the displacement detection mechanism according to the present application can achieve three-dimensional displacement monitoring in a high-temperature environment;

4. according to the present application, hot air is introduced into the cabin body through the air inlet to provide a high-temperature environment for the sample, and a cold source can be injected into the cabin body through the cold source port to provide a low-temperature environment for the sample; therefore, rock physico-mechanical experiments can be performed in real-time under high-temperature and low-temperature environments;

5. the experimental cabin according to the present application adopts a unique three-way sealing structure, so that a three-way synchronous percolation test can be achieved; and 6. the present application is provided with multiple measuring channels and can achieve three-way multi-parameter synchronous monitoring and acquisition of acoustic emission, ultrasonic wave, temperature field, percolation field and heat flow field.

BRIEF DESCRIPTION OF DRAWINGS

The drawings illustrated herein are used to provide a further understanding of the embodiments of the present application, constitute a part of the present application, and do not constitute a limitation to the embodiments of the present invention.

in the drawings.

Figure 1:
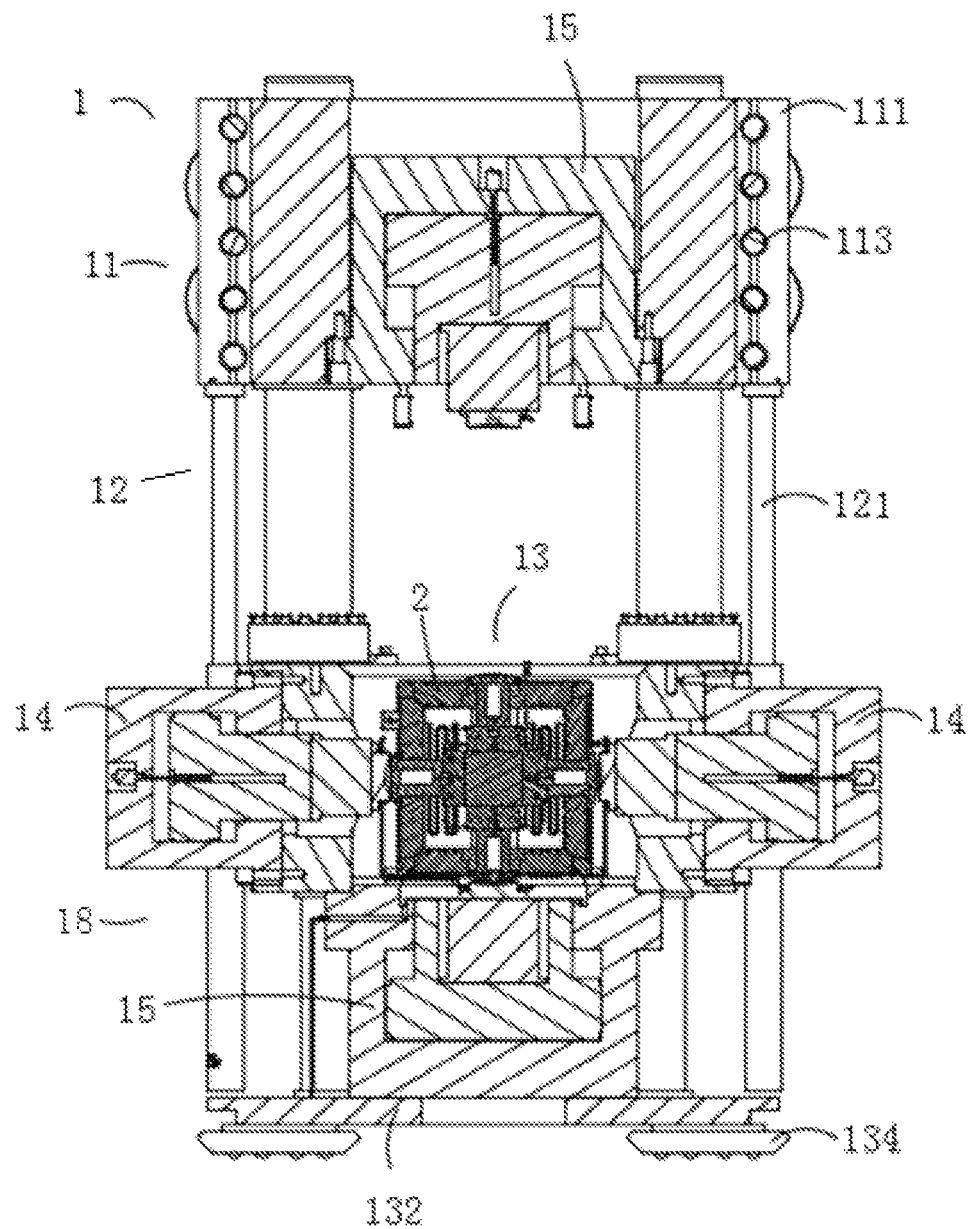
FIG. 1 is a schematic diagram of a structure of a rock physico-mechanical testing system in simulated environments of deep earth, deep space, and deep sea according to an embodiment.
Figure 2:
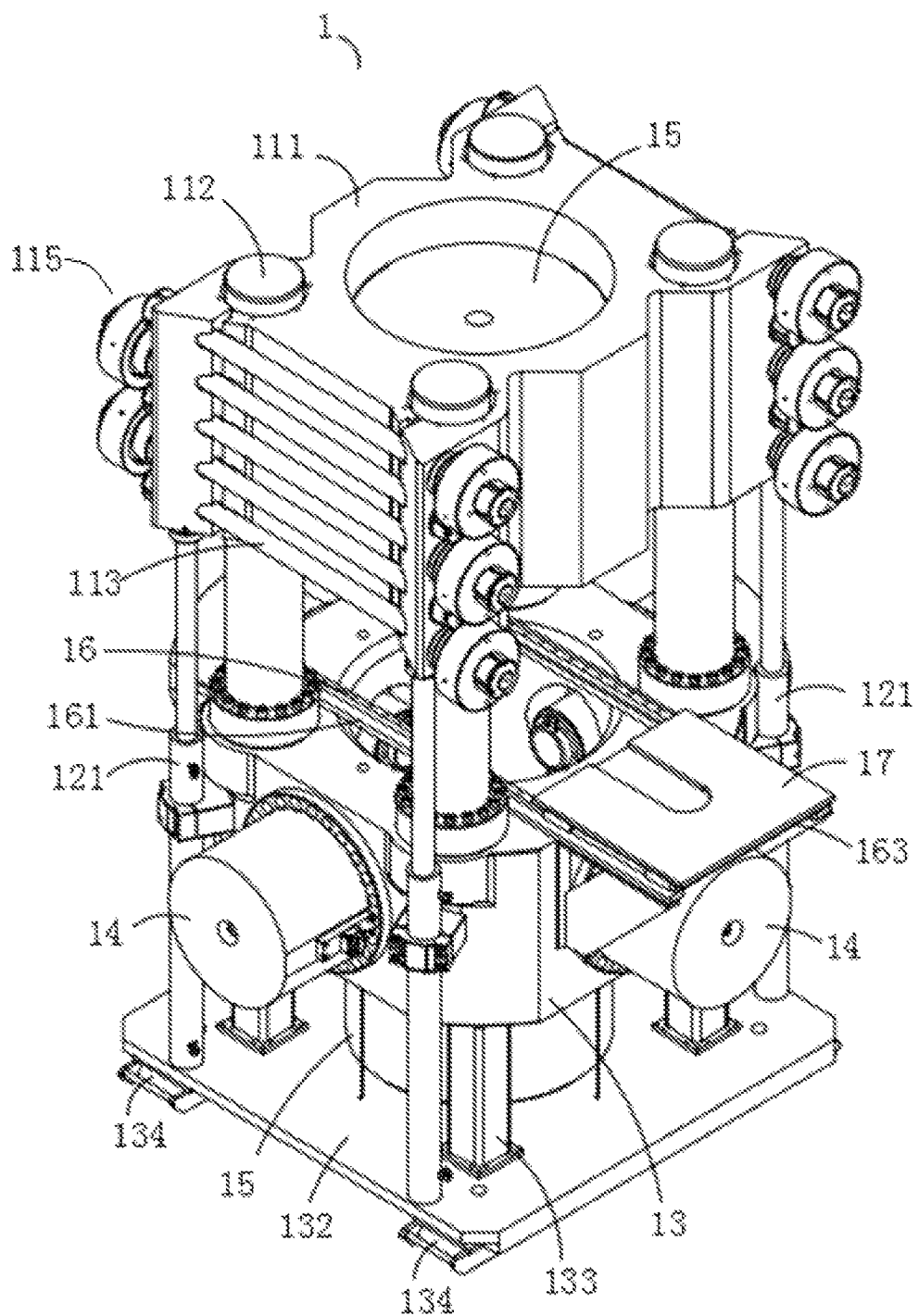
FIG. 2 is a three-dimensional view of a three-axis six-direction loading system according to an embodiment.

1: three-axis six-direction loading system, 10: sample, 11: beam assembly, 12: beam moving mechanism, 13: loading frame, 14: horizontal actuator, 15: vertical actuator, 16: linear guide rail, 17: sliding plate, 18: true triaxial stress loading mechanism;

101: cylinder barrel, 102: piston, 103: actuating indenter, 104: first displacement sensor, 105: force sensor, 106: U-shaped water-cooling pipe;

111: moving beam, 112: bearing column, 113: clamping hydraulic cylinder, 114: bearing nut, 115: beam locking mechanism, 1111: clamping opening, 1131: pull rod, 1132: hydraulic locking cylinder, 1133: locking nut, 1134: thrust joint bearing, 121: lift hydraulic cylinder, 130: experimental cabin accommodation chamber, 131: loading frame beam, 132: base, 133: support leg, 134: ground tank, 135: loading port, 161: guide rail base plate, 162: support angle plate, 163: base plate, 171: linear notch;

2: experimental cabin;

31: outer cubic frame, 32: wall plate, 33: elastic plate, 34: electric heating element, 35: electrode cover, 36: air inlet, 37: air outlet, 38: cold source port, 321: first plate, 322: second plate, 323: third plate, 331: strip-shaped notch, 391: percolation inlet pipe, 392: percolation outlet pipe and 393: sealing main pipe;

4: butting indenter, 41: heating plate;

5: elastic pressure box, 50: temperature sensor, 51: indenter, 52: elastic piece, 53: thermal conductive pad, 55: heat flow sensor, 56: cushion block, 57: circumferential sealing strip, 58: acoustic emission probe, 59: ultrasonic probe, 511: indenter body, 512: permeation block, 513: rectangular convex block, 514: percolation medium channel, 515: sealing medium injection channel, 516: permeation hole, 517: annular sealing groove, 518: embedding groove, 561: serpentine groove, 562: ceramic ring, 571: annular groove;

6: displacement detection mechanism, 61: first connection seat, 62: second connection seat, 63: first lead-out rod, 64: second lead-out straight rod, 65: sensor mounting seat, 66: second displacement sensor, 67: extensometer rod;

7: sample holder, 71: rigid outer cubic frame, 72: flexible inner cubic frame, 721: frame edge, 722: annular flange, 723: outside corner position, 724: right-angle edge structure; and 100: cabin body, 200: through hole.

DESCRIPTION OF EMBODIMENTS

To make objectives, technical solutions, and advantages of the present application clearer, the following clearly and completely describes technical solutions in embodiments of the present invention with reference to accompanying drawings in embodiments. It is clear that the described embodiments are merely some but not all of embodiments of the present invention. Generally, components of embodiments of the present invention described and shown in the accompanying drawings herein may be arranged and designed in various configurations.

Therefore, the following detailed descriptions of embodiments of the present invention provided in the accompanying drawings are not intended to limit the scope of the present invention that claims protection, but merely to represent selected embodiments of the present invention. Based on the embodiments of the present invention, all other embodiments obtained by those of ordinary skill in the art without creative effort shall fall within the protection scope of the present invention.

It should be noted that the embodiments and features in the embodiments of the present invention can be combined with each other without conflict. It should be noted that the embodiments in the specification are all described in a progressive manner, and each embodiment focuses on differences from other embodiments, and portions that are the same and similar between the embodiments may be referred to each other.

In the description of the present invention, it should be noted that an orientation or position relationship indicated by terms "upper", "lower", "inner", "outer", or the like is an orientation or position relationship based on the accompanying drawings, or an orientation or position relationship that the product of the present invention is usually placed when in use, or an orientation or positional relationship commonly understood by those skilled in the art. These terms are merely used to facilitate and simplify description of the present invention, instead of indicating or implying that a mentioned apparatus or element must have a specific orientation or be constructed and operated in a specific orientation, and therefore the terms cannot be construed as a limitation on the present invention. In addition, the terms "first", "second" and the like are merely intended for differentiated description, and should not be construed as an indication or an implication of relative importance.

In descriptions of the present invention, it should be further noted that, unless otherwise expressly specified and limited, terms "arranged", "mount", "interconnect" and "connect" should be understood in a broad sense. For example, such terms may indicate a fixed connection, a detachable connection, or an integral connection; may indicate a mechanical connection or an electrical connection; and may indicate direct interconnection, indirect interconnection through an intermediate medium, or internal communication between two elements. For those of ordinary skill in the art, the specific meanings of the aforementioned terms in the present invention can be understood according to specific conditions.

Embodiment 1

As shown in FIG. 1, the rock physico-mechanical testing system in simulated environments of deep earth, deep space, and deep sea disclosed in this embodiment comprises a three-axis six-direction loading system 1 and an experimental cabin 2.

As shown in FIGS. 1 to 7, the three-axis six-direction loading system 1 comprises a loading main machine and a power system, wherein the loading main machine comprises a beam assembly 11, a beam moving mechanism 12, a loading frame 13 and a true triaxial stress loading mechanism 18.

The true triaxial stress loading mechanism 18 is configured to provide true triaxial stress to a sample. The true triaxial stress loading mechanism 18 is provided with an actuator in each of six directions. Specifically, the true triaxial stress loading mechanism 18 comprises two horizontal actuators 14 in the X-axis direction, two horizontal actuators 14 in the Y-axis direction and two vertical actuators 15 in the Z-axis direction, where the power system comprises a pump station and the like.

The six actuators are respectively located in six directions of the loading frame 13. The loading frame 13 is provided with an experimental cabin accommodation chamber 130 for accommodating the experimental cabin, and the experimental cabin accommodation chamber 130 is provided with a loading port 135 in the each of upper, lower, left, right, front and rear directions. The loading ports 135 in six directions are each adapted to one of the actuators in six directions, and the three-axis six-direction loading can be provided to a rock sample in the loading frame 13 through the actuators in six directions.

The beam assembly 11 is configured to mount an upper vertical actuator 15, and the beam moving mechanism 12 is configured to achieve the up-and-down movement of the upper vertical actuator 15.

Figure 6:
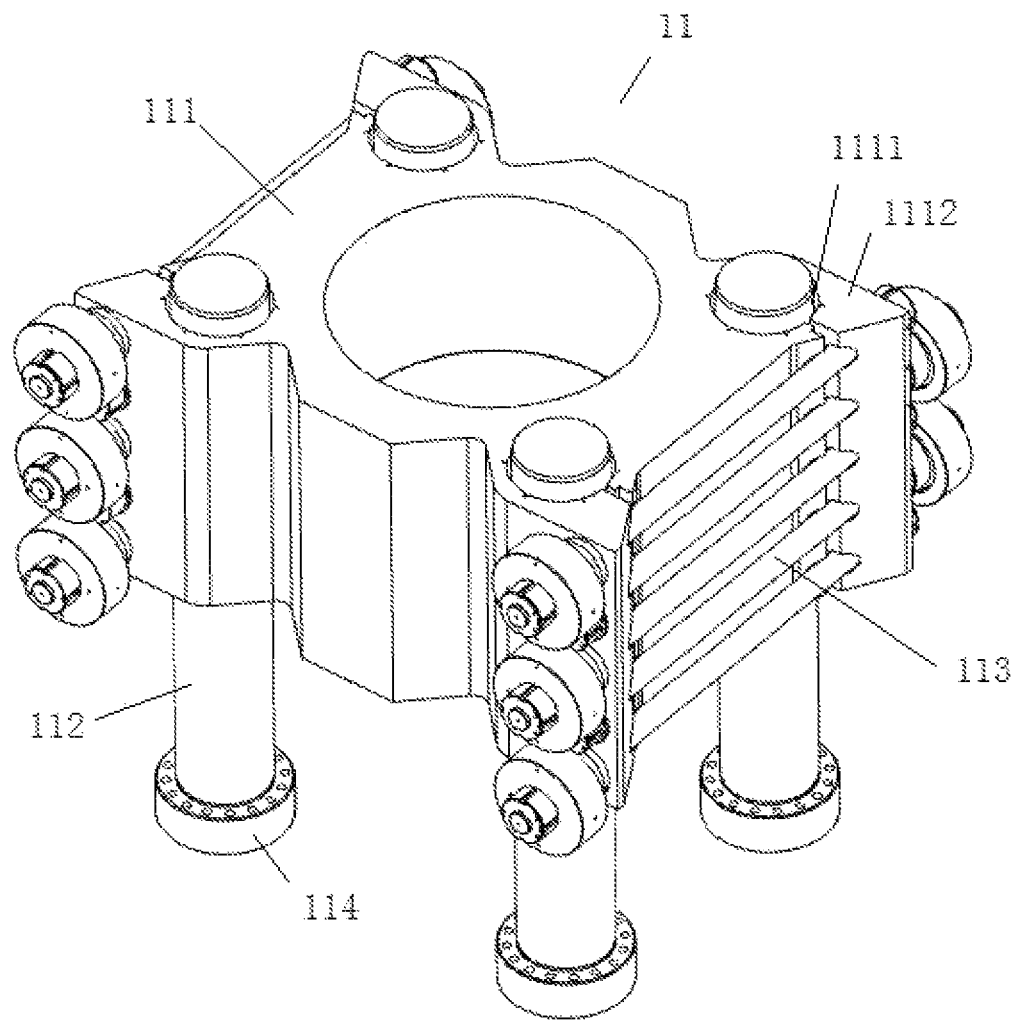
FIG. 6 is a three-dimensional view of a beam assembly according to an embodiment.

In a possible design, as shown in FIG. 6, the beam assembly 11 comprises a moving beam 111, a plurality of vertically disposed bearing columns 112, a bearing nut 114 and a beam locking mechanism 115.

A lower end of the bearing column 112 is fixed with the loading frame 13 through the bearing nut 114, the moving beam 111 is mounted on a plurality of bearing columns 112, the beam moving mechanism 12 is configured to achieve the up-and-down movement of the moving beam 111 along the bearing column 112, the moving beam 111 and the plurality of bearing columns 112 may be fixed through the beam locking mechanism 115, and the upper vertical actuator 15 is mounted in a center of the moving beam 111.

It should be noted that a number of the bearing columns 112 is set reasonably based on a requirement. In a possible design, four bearing columns 112 are vertically provided, the four bearing columns 112 are uniformly arranged around the upper vertical actuator 15, the moving beam 111 is provided with four clamping openings 1111 adapted to the bearing columns 112, the upper ends of the bearing columns 112 are arranged in the clamping openings 1111, the lower ends of the bearing columns 112 are fixedly connected to the loading frame 13, and a guide sleeve is arranged between the bearing columns 112 and hole walls of the clamping openings 1111.

The beam locking mechanism 115 is configured to achieve the clamping openings of the moving beams 111 to clamp or loosen the bearing columns 112. In a possible design, the beam locking mechanism 115 comprises two sets of clamping hydraulic cylinders 113, an extended clamping arm 1112 is arranged outside each clamping opening 1111, the clamping arms 1112 and the moving beam 111 are integrally manufactured, and the clamping arms 1112 of every two clamping openings 1111 are tensioned through one set of clamping hydraulic cylinders 113 so as to simultaneously clamp and fix two corresponding bearing columns 112 and the moving beam 111.

Figure 4:
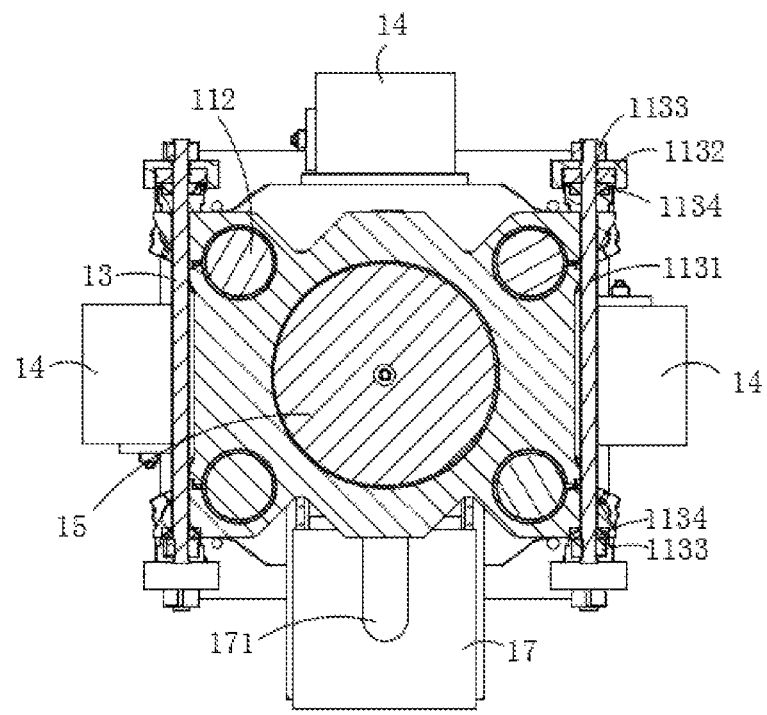
FIG. 4 is a cross-sectional view at B-B in FIG. 3.

In a possible design, as shown in FIG. 4, the clamping hydraulic cylinder 113 comprises a pull rod 1131, a hydraulic locking cylinder 1132, a locking nut 1133 and a thrust joint bearing 1134, and the hydraulic locking cylinder 1132, the locking nut 1133 and the thrust joint bearing 1134 are all mounted on the pull rod 1131. The clamping arm 1112 is provided with a hole adapted to the pull rod 1131, two ends of the pull rod 1131 are respectively arranged in the holes corresponding to the two clamping arms 1112, two ends of the pull rod 1131 are provided with locking nuts 1133, a thrust joint bearing 1134 is arranged between the locking nut 1133 at one end and the clamping arm 1112, a hydraulic locking cylinder 1132 is arranged between the locking nut 1133 at the other end and the other clamping arm 1112, and a thrust joint bearing 1134 is arranged between the hydraulic locking cylinder 1132 and the other clamping arm 1112.

It should be noted that a number of each set of clamping hydraulic cylinders 113 is set reasonably based on a requirement. In a possible design, 10 clamping hydraulic cylinders 113 are provided on two sides of the moving beam 111, and each of the two clamping arms 1112 is tensioned by 5 clamping hydraulic cylinders 113, so that a loading cylinder of the upper vertical actuator 15 can be fixed at a set position and not moved, and then can be pressurized by the actuating indenter of the actuator.

In a possible design, the beam moving mechanism 12 comprises a plurality of lift hydraulic cylinders 121, and the plurality of lift hydraulic cylinders 121 are supported between the beam assembly 11 and the loading frame 13. It should be noted that a number of lift hydraulic cylinders 121 is set reasonably based on a requirement. Optionally, four lift hydraulic cylinders 121 are provided in the vertical Z-axis direction, the four lift hydraulic cylinders 121 are adapted to the four bearing columns 112 one by one to achieve the up-and-down movement of the upper vertical actuator 15.

The movable space of the moving beam 111 in this embodiment is steplessly adjustable, can be automatically locked through the hydraulic locking cylinder 1132, and can be manually adjusted through the locking nut 1133. The adjusting operation of the test space is convenient, the locking is rapid, and the operation is convenient and rapid.

Figure 7:
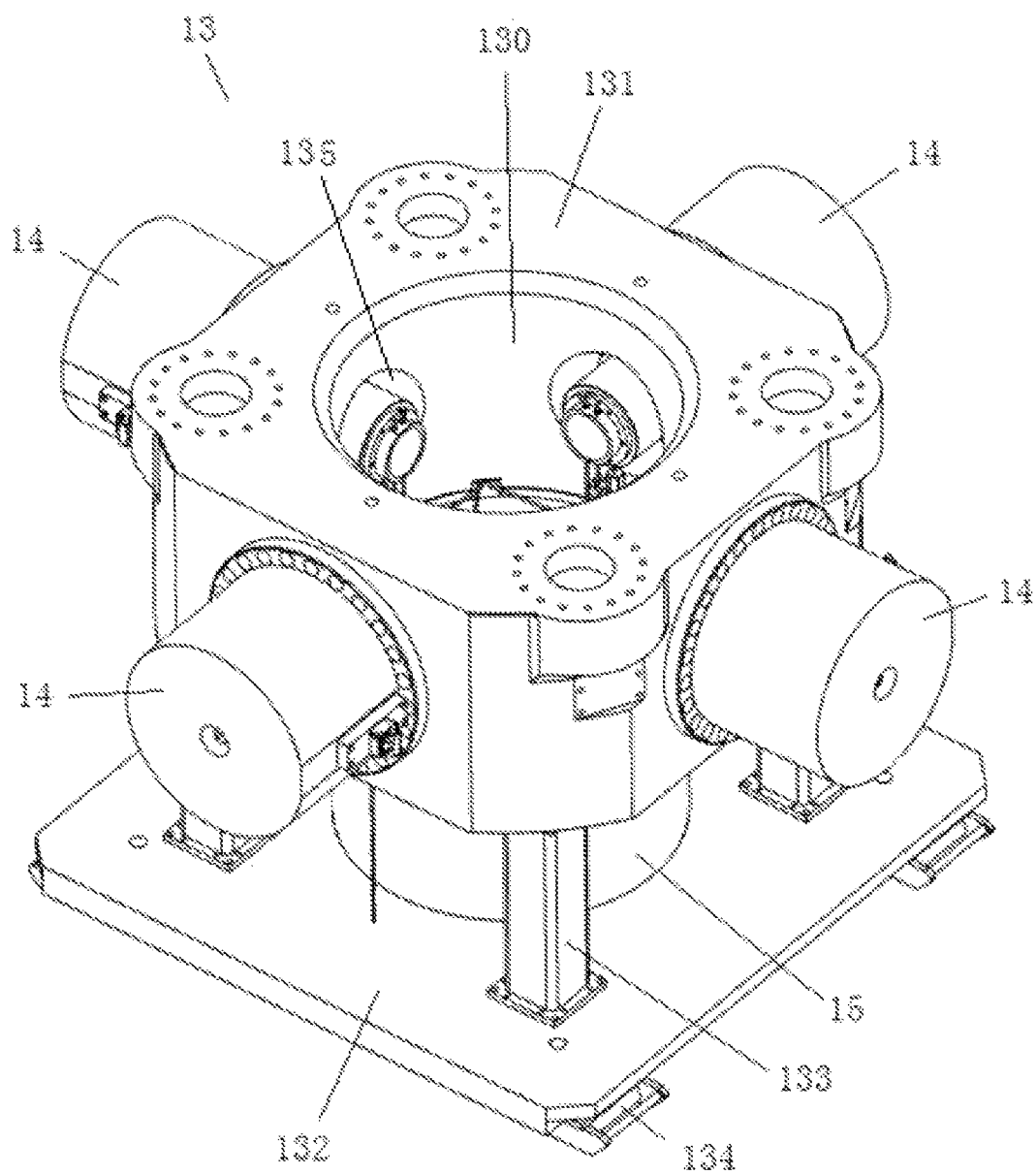
FIG. 7 is a three-dimensional view of a loading frame according to an embodiment.

In a possible design, as shown in FIG. 7, the loading frame 13 comprises a loading frame beam 131, a base 132, a support leg 133 and a ground tank 134. The loading frame beam 131 is an integrally cast high-rigidity structure, a plurality of support legs 133 are arranged between the loading frame beam 131 and the base 132, and a plurality of ground tanks 134 are uniformly mounted at a bottom of the base 132.

It should be noted that a number of the support legs 133 and the ground tanks 134 is set reasonably based on a requirement. A lower end of the bearing column 112 is fixedly connected to a top of the loading frame beam 131 through a bearing nut 114, the bearing nut 114 is in threaded connection with the bearing column 112, and the bearing nut 114 is fixedly connected to the loading frame beam 131 through a plurality of screws.

The experimental cabin accommodation chamber 130 is located in a center of the loading frame beam 131, the experimental cabin accommodation chamber 130 passes through a top surface of the loading frame beam 131, and the experimental cabin can be placed into the accommodation chamber from top to bottom, and also serves as a loading port 135 for the upper vertical actuator 15 to apply vertical stress.

Figure 5:
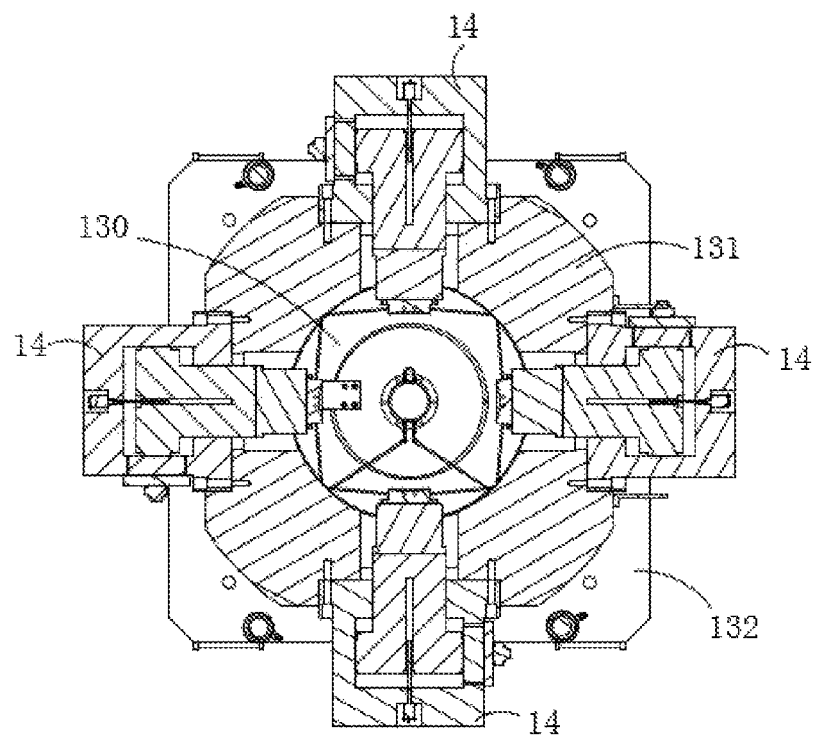
FIG. 5 is a cross-sectional view at C-C in FIG. 3.
Figure 8:
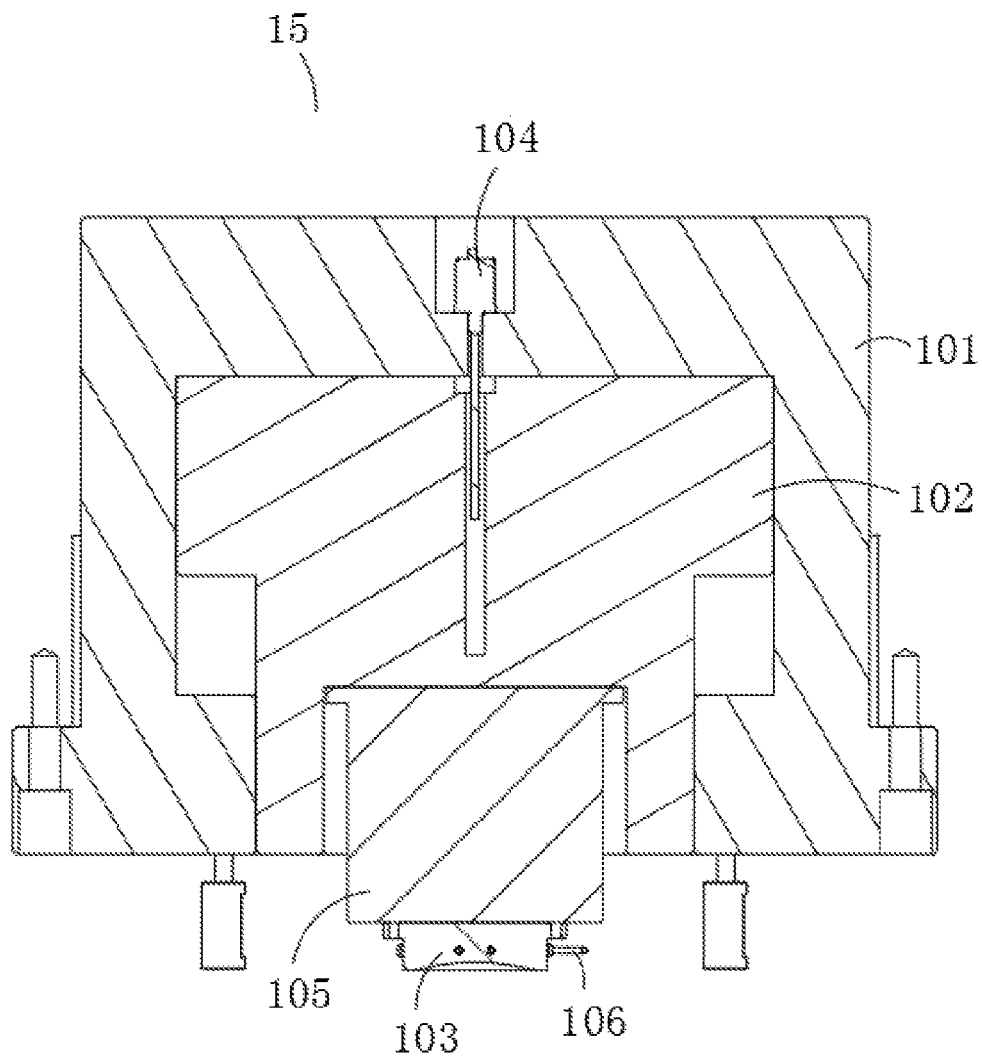
FIG. 8 is a schematic diagram of a structure of an upper vertical actuator according to an embodiment.

As shown in FIGS. 5 and 8, the upper vertical actuator 15, the lower vertical actuator 15 and the 4 horizontal actuators 14 each comprise a loading cylinder and an actuating indenter 103, and the actuating indenter 103 is connected to an output end of the loading cylinder.

Each of front, rear, left and right sides of the loading frame beam 131 is provided with a round loading port 135 adapted to one of the horizontal actuators 14, a bottom of the loading frame beam 131 is provided with a round loading port 135 adapted to the lower vertical actuator 15, and the loading port 135 is communicated with the experimental cabin accommodation chamber 130. The loading cylinders of the four horizontal actuators 14 are respectively arranged at the loading ports 135 at a periphery of the loading frame beam 131 through flange holes and screws, and a loading cylinder of the lower vertical actuator 15 is mounted at the loading port 135 at the bottom of the loading frame beam 131 through flange holes and screws.

In a possible design, a lower end of the loading cylinder of the lower vertical actuator 15 is connected to the base 132 by screws, four support legs 133 are uniformly arranged around the lower vertical actuator 15, and four ground tanks 134 are mounted at four corners of the rectangular base 132.

In a possible design, the lift hydraulic cylinder 121 is supported between the loading frame beam 131 and the moving beam 111. Optionally, the lift hydraulic cylinder 121 comprises an engineering cylinder, an upper end of a piston rod of the engineering cylinder is fixedly connected to the moving beam 111, and a cylinder barrel of the engineering cylinder is fixedly connected to the loading frame beam 131 through a lift hydraulic cylinder fixing clamp. The lift hydraulic cylinder fixing clamp is clamped with the cylinder barrel of the engineering cylinder, and the lift hydraulic cylinder fixing clamp is fixed with the loading frame beam 131 through screws.

In a possible design, two horizontally arranged linear guide rails 16 are provided at a top of the loading frame beam 131, a spacing distance between the two linear guide rails 16 is less than a diameter of a top opening of the experimental cabin accommodation chamber 130, the two linear guide rails 16 cross over from the top opening of the experimental cabin accommodation chamber 130, a sliding plate 17 is in sliding connection with the two linear guide rails 16, and the sliding plate 17 can move to a position right above the top opening of the experimental cabin accommodation chamber 130 or move to a position where the top opening of the experimental cabin accommodation chamber 130 is exposed after the movement along the linear guide rails 16. The sliding plate 17 may support and move the experimental cabin.

The sliding plate 17 is provided with a linear notch 171 parallel to the linear guide rail 16, one end of the linear notch 171 is opened on an edge of the sliding plate 17, and the other end of the sliding plate 17 is an arc-shaped closed end.

Optionally, at least one end of each of the two linear guide rails 16 extends out of the loading frame beam 131 to form a suspended section, the two linear guide rails 16 are each mounted on one guide rail base plate 161, a support angle plate 162 is provided between the suspended section of each of the two guide rail base plates 161 and the loading frame beam 131, and the suspended sections of the two guide rail base plates 161 are connected together through a base plate 163.

In a possible design, as shown in FIGS. 5 and 8, the vertical actuator 15 and the horizontal actuator 14 each comprise a cylinder 101, a piston 102 and an actuating indenter 103, a first displacement sensor 104 is provided between the cylinder 101 and the piston 102, and the actuating indenter 103 is connected to a free end of the piston 102. A servo valve is mounted on the cylinder 101, and a force sensor 105 is provided between the actuating indenter 103 and the piston 102. The cylinder barrel 101 of the upper vertical actuator 15 is fixedly connected to the moving beam 111 through flange holes and screws, and the cylinder barrels 101 of the lower vertical actuator 15 and the lower horizontal actuator 14 are fixedly connected to the loading frame beam 131 through flange holes and screws.

Optionally, the actuating indenters 103 of the vertical actuator 15 and the horizontal actuator 14 are each provided with two cooling channels, the actuating indenter 103 is provided with a U-shaped water-cooling pipe 106, one end of each of the two cooling channels is connected to two ends of the U-shaped water-cooling pipe 106, and the other end of each of the two cooling channels is used to connect a water supply pipeline and a water return pipeline. The cooling water supplied from the water supply pipeline flows into the U-shaped water-cooling pipe 106 through one cooling channel, flows into the other cooling channel through the U-shaped water-cooling pipe 106, and is finally sent away from the return water pipe, thereby achieving the cooling of the actuator indenter 103.

Optionally, the actuating indenter 103 is a ball-and-socket indenter, and a rear end of a corresponding butting indenter 4 of the experimental cabin is a ball head, so that the indenters can be contacted and uniformly loaded conveniently, and the phenomenon that the sample and the component are inclined to some extent and are unevenly loaded can be avoided.

In a possible design, the moving beam 111 and the loading frame beam 131 are made of high-quality cast alloy steel, the bearing column 112 is treated with alloy steel surface chrome plating and polishing process, and the beam assembly 11 and the loading frame 13 constitute a main machine frame with sufficient rigidity to meet 12 GN/m.

The present application can meet the monitoring and control of a range of the actuator through the first displacement sensor 104. In a possible design, the first displacement sensor 104 is a magnetostrictive displacement sensor. An actuator deformation sensor adopts a magnetostrictive displacement sensor, and a range of the actuator can be met.

Optionally, a rated working pressure of the vertical actuator 15 and the horizontal actuator 14 is at least 28 MPa; the actuator is provided with a special sealing ring, so that the friction is low, the control is stable, a plurality of sets of guide rings are additionally arranged for guiding, and the sealing is reliable; and the offset abrasion of the actuator during long-term operation is prevented.

The existing uniaxial, conventional triaxial and medium-low stress true triaxial test loading system can only provide a pressure of 1000-2000 kN and can only provide a maximum stress of 200 MPa for a cubic sample of 100 mm, namely a maximum simulation depth is 8000 m, and the requirement of simulating the deep ground stress cannot be met. Therefore, in a possible design, for the horizontal actuator 14, a pressure is 4000 kN, a control precision is 0.4 kN, a static force measurement indication precision: ≤±0.5%, a measurement range: 1%-100% FS, a maximum displacement is 100 mm, a displacement measurement precision: ±0.5% FS, and a loading rate: 0.001-1 mm/s adjustable.

In a possible design, for the vertical actuator 15, a pressure is 10000 kN, a static force measurement indication precision: ≤±0.5%, a measurement range: 1%-100% FS, a maximum displacement is 100 mm, a displacement measurement precision: ±0.5% FS, a conventional loading rate is 0.001-1 mm/s, and a maximum instantaneous impact release rate is 10 mm/s. Optionally, the ground tank 134 is a 15 ton ground tank.

In a possible design, two hoisting members are designed at two ends below the vertical Z axis and can be connected to experimental cabins with different functions.

The loading frame beam 131 according to the present application can accommodate experimental cabins 2 with different functions to enter the experimental cabin accommodation chambers 130 for experiment.

Figure 9:
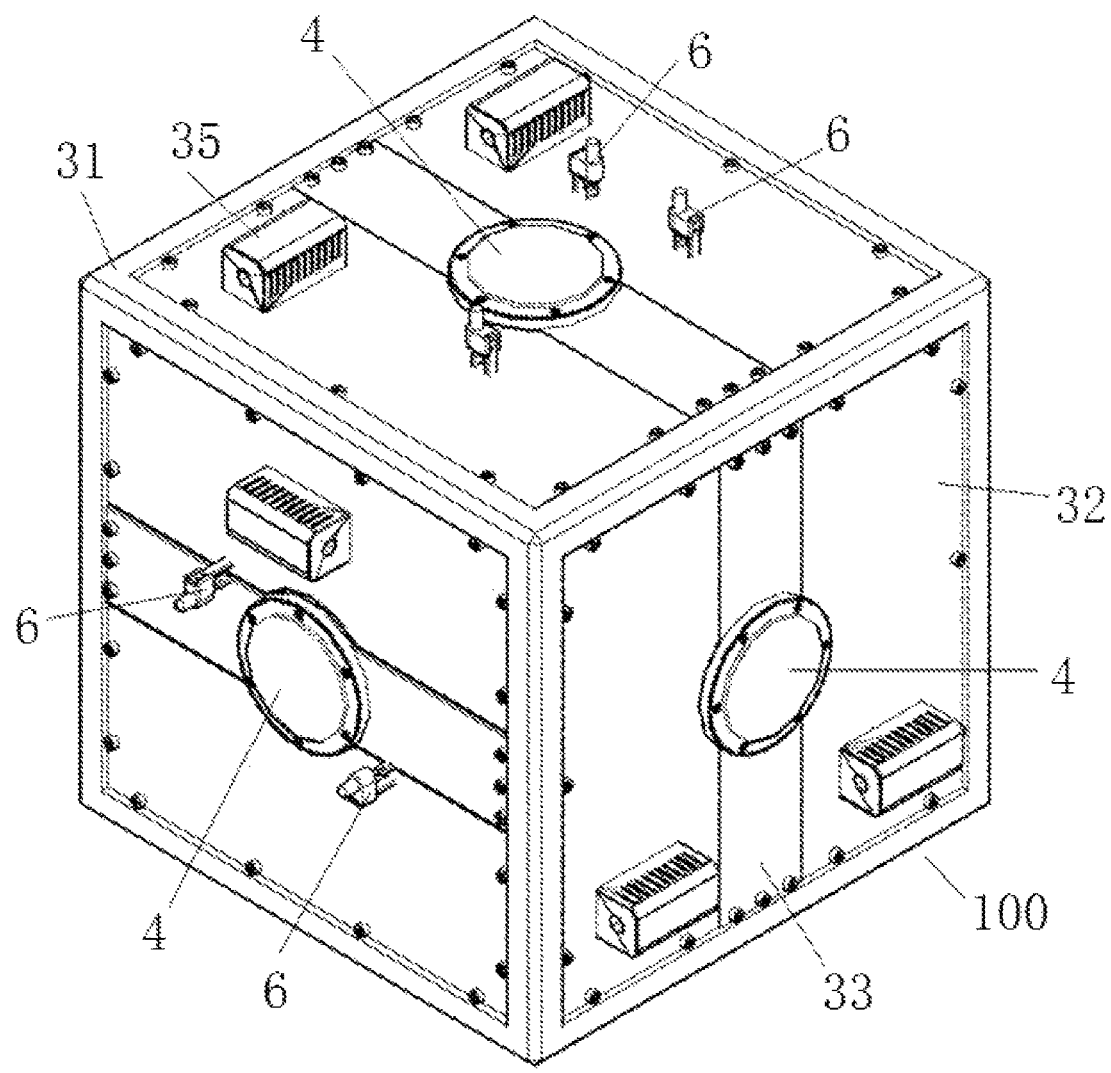
FIG. 9 is a three-dimensional view of an experimental cabin according to Embodiment 1.
Figure 10:
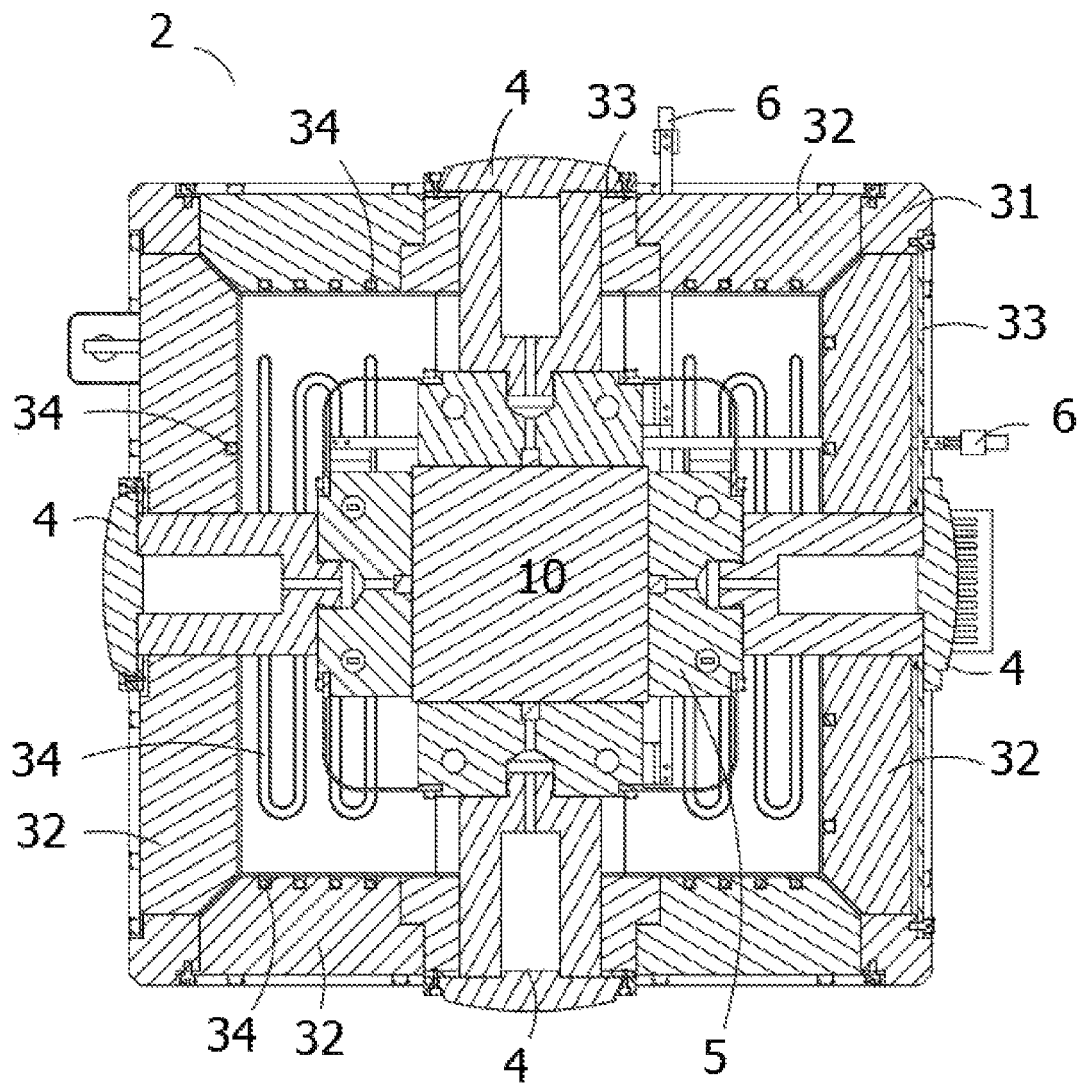
FIG. 10 is a cross-sectional view of an experimental cabin according to Embodiment 1.

As shown in FIGS. 9 and 10, the experimental cabin 2 with a geothermal function disclosed in this embodiment comprises a cabin body 100, a butting indenter 4 and an elastic pressure box 5, the cabin body 100 has a space for accommodating the elastic pressure box 5, the elastic pressure box 5 is operatively placed in the cabin body 100, and the cabin body 100 is operatively placed in an experimental cabin accommodation chamber 130.

6 butting indenters 4 are provided, and the 6 butting indenters 4 are respectively located on the X-axis direction, the Y-axis direction and the Z-axis direction. The cabin body 100 is a hexahedral structure, each face of the cabin body is provided with one butting indenter 4, 6 butting indenters 4 are respectively arranged in through holes 200 on six faces of the cabin body 100, the butting indenters 4 can axially move relative to the cabin body 100, front ends of the butting indenters extend into the cabin body 100, and rear ends of the butting indenters are exposed out of the cabin body 100.

The rear ends of the 6 butting indenters 4 are respectively configured to butt with the actuating indenters 103 of the 6 actuators of the three-axis six-direction loading system 1, the front ends of the 6 butting indenters 4 are respectively configured to butt with the rear ends of the 6 indenters 51 of the elastic pressure box 5, and the front ends of the 6 indenters 51 are respectively configured to contact with 6 faces of the sample 10.

In a possible design, the cabin body 100 is integrally mounted by an outer cubic frame 31 with high rigidity, and the outer cubic frame 31 is integrally-manufactured, so that the stability of an entire system can be ensured; and wall plates 32 are provided in 6 directions of the cabin body 100 and screwed to the outer cubic frame 31, and 6 butting indenters 4 are each mounted in a center of one of the wall plates 32.

An electric heating element 34 is embedded in each of the wall plates 32 in 6 directions, and an electrode cover 35 adapted to the electric heating element 34 are provided outside the wall plate 32. Particularly, the electric heating element 34 is a resistive heating wire. The wall plate 32 is preferably of a thermal insulation material.

In a possible design, the wall plate 32 has the following two configurations.

Figure 11:
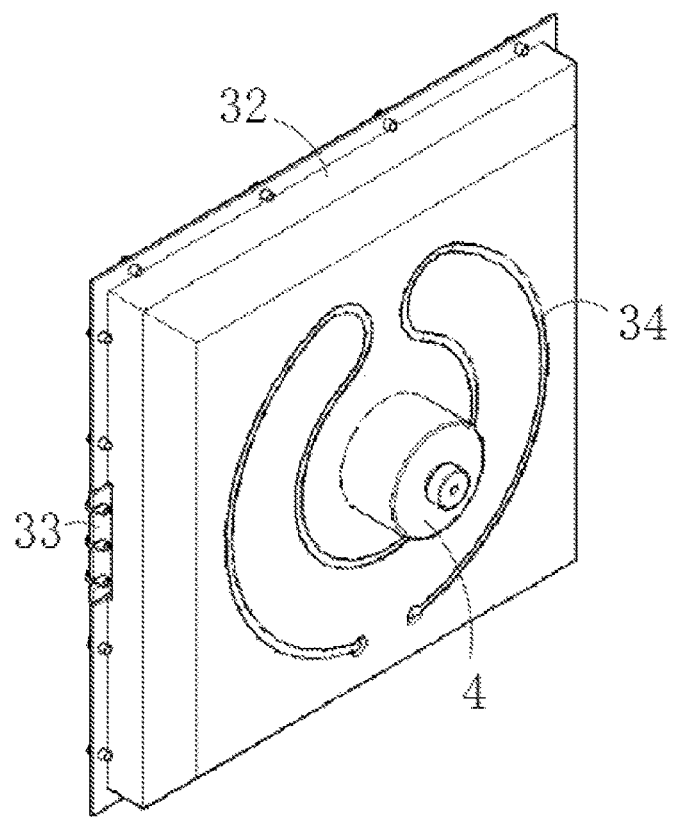
FIG. 11 is a three-dimensional view of a first wall plate according to an embodiment.
Figure 12:
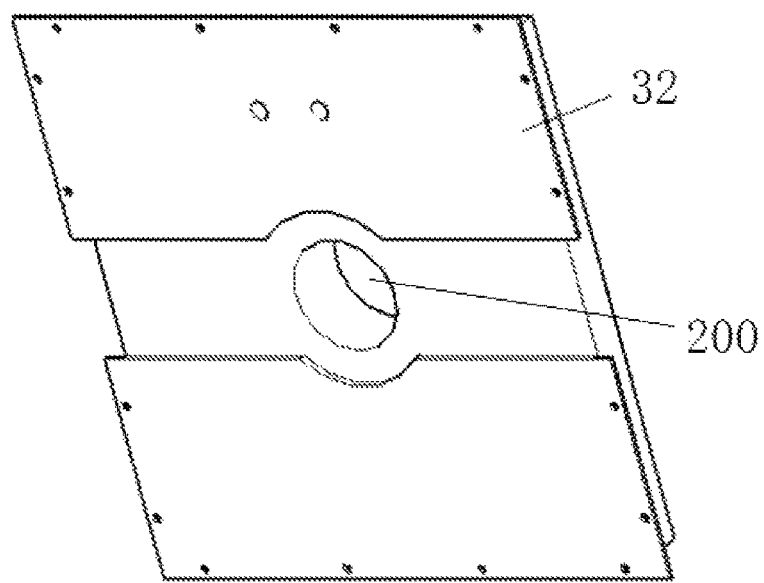
FIG. 12 is a three-dimensional view of a plate body of a first wall plate according to an embodiment.

Firstly, as shown in FIGS. 10, 11 and 12, the plate body the wall plate 32 is integrally-manufactured, and an outer side of the wall plate 32 is provided with an elastic plate 33, two ends of the elastic plate 33 are movably connected to the outer cubic frame 31, and a gap is formed between the elastic plate 33 and an outer surface of the wall plate 32. The elastic plate 33 and the wall plate 32 are provided with coaxial through holes 200, the butting indenter 4 is mounted in the through holes 200, and the butting indenter 4 is fixedly connected to the elastic plate 33 through screws. Optionally, an adapted plate groove is provided at a position that is of the outer surface of the wall plate 32 and that corresponds to the elastic plate 33, so that a gap is formed between the elastic plate 33 and the outer surface of the wall plate 32.

Optionally, the electrical heating elements 34 on the wall plate 32 are arranged annularly, and an adapted electrode cover 35 is provided outside the wall plate 32.

Figure 13:
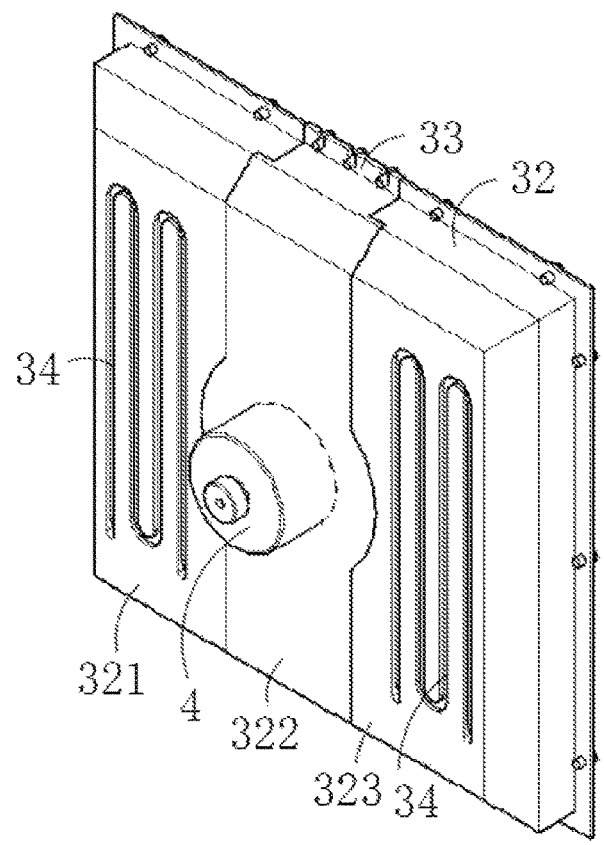
FIG. 13 is a three-dimensional view of a second wall plate according to an embodiment.
Figure 14:
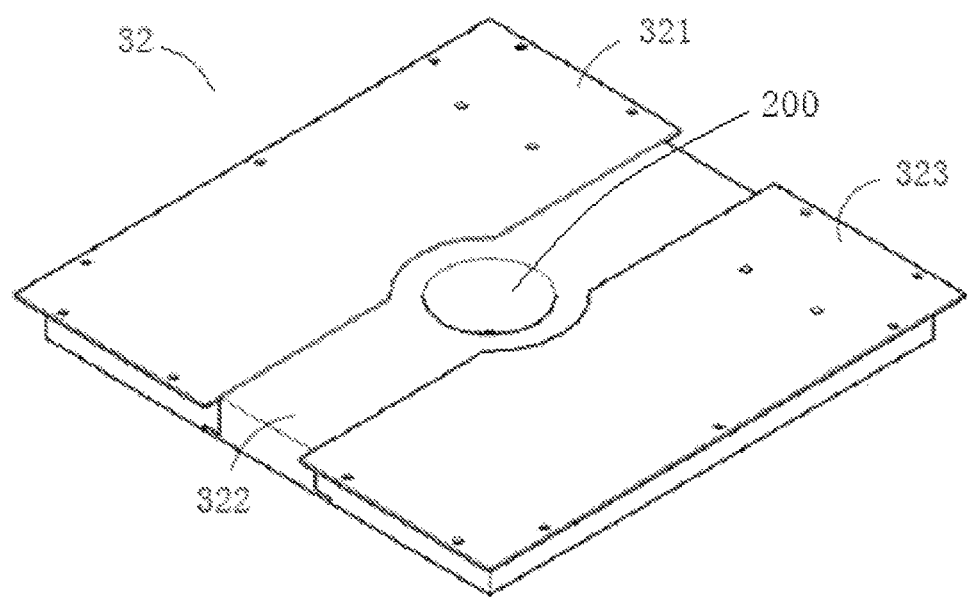
FIG. 14 is a three-dimensional view of a plate body of a second wall plate according to an embodiment.

Secondly, as shown in FIGS. 10, 13 and 14, the plate body of the wall plate 32 is manufactured separately as a first plate 321, a second plate 322 and a third plate 323, wherein the first plate 321, the second plate 322 and the third plate 323 are assembled in sequence to form the wall plate 32, the second plate 322 is located between the first plate 321 and the third plate 323, the butting indenter 4 is mounted on the second plate 322, the first plate 321 and the third plate 323 are fixedly connected to the outer cubic frame 31 through screws, the electric heating element 34 is mounted on the first plate 321 and the third plate 323, and the outer parts of the first plate 321 and the third plate 323 are each provided with an electrode cover 35 that is adapted to the electric heating element 34. Optionally, the electric heating elements 34 on the first plate 321 and the third plate 323 are arranged in a rectangular shape and in a serpentine shape.

The elastic plate 33 is provided outside the second plate 322, two ends of the elastic plate 33 are movably connected to the outer cubic frame 31, coaxial through holes 200 are provided on the elastic plate 33 and the second plate 322, the butting indenters 4 are mounted in the through holes 200, and the butting indenters 4 are fixed with the elastic plate 33 and the second plate 322 through screws. Particularly, an outer surface of the second plate 322 is formed lower than the first plate 321 and the second plate 322 to form a plate groove adapted to the elastic plate 33, and the elastic plate 33 is mounted in the plate groove.

In a possible design, the second plate 322 is slidably engaged with the first plate 321 and the third plate 323, the first plate 321 and the third plate 323 are provided with limiting steps for preventing the second plate 322 from sliding outward, and two sides of the second plate 322 are provided with steps adapted to the limiting steps. The second plate 322 may move inwardly relative to the first plate 321 and the third plate 323 to transmit a pressing force; after an external force disappears, the elastic plate 33 drives the second plate 322 to reset. Optionally, a cross-section of the second plate 322 is T-shaped.

Figure 15:
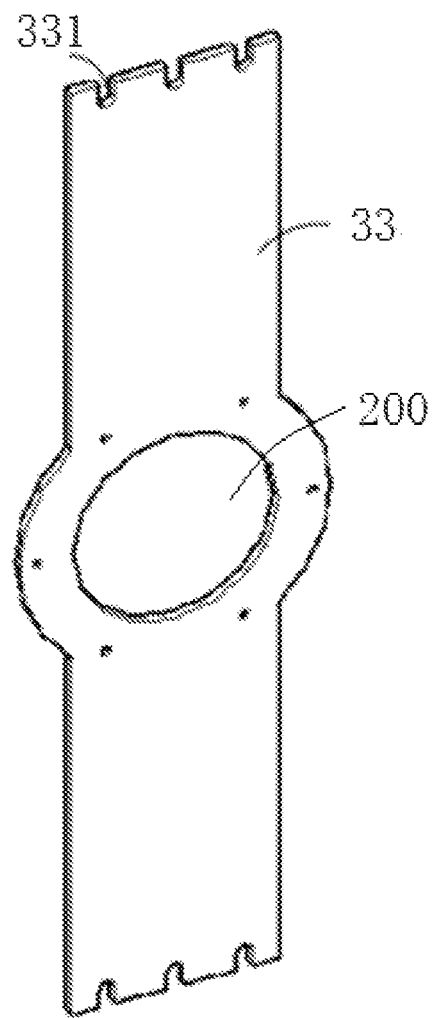
FIG. 15 is a three-dimensional view of an elastic plate according to an embodiment.

Optionally, as shown in FIG. 15, strip-shaped notches 331 are formed at two ends of the elastic plate 33, adapted screws are mounted at a position that is of the outer cubic frame 31 and that corresponds to the strip-shaped notches 331, two ends of the elastic plate 33 are respectively clamped on the screws of the outer cubic frame 31 through the strip-shaped notches 331, so that the elastic plate 33 is movably connected to the outer cubic frame 31, and the screws can slide in the strip-shaped notches 331 under the action of an axial external force.

It should be noted that the 6 wall plates 32 of the cabin body 100 may all adopt wall plates 32 in the first configuration, or may all adopt wall plates 32 in the second configuration, or may partly adopt wall plates 32 in the first configuration and partly adopt wall plates 32 in the second configuration.

When in use, a temperature of a cabin environment can be set based on an experiment requirement. In a possible design, the temperature can be between +10° C. and 600° C. at room temperature, and the temperature uniformity is 5° C.

In a possible design, two hoisting members are provided at the top of the cabin body 100 and can be connected to corresponding portions of the beam assembly 11 of the three-axis six-direction loading system 1.

Figure 16:
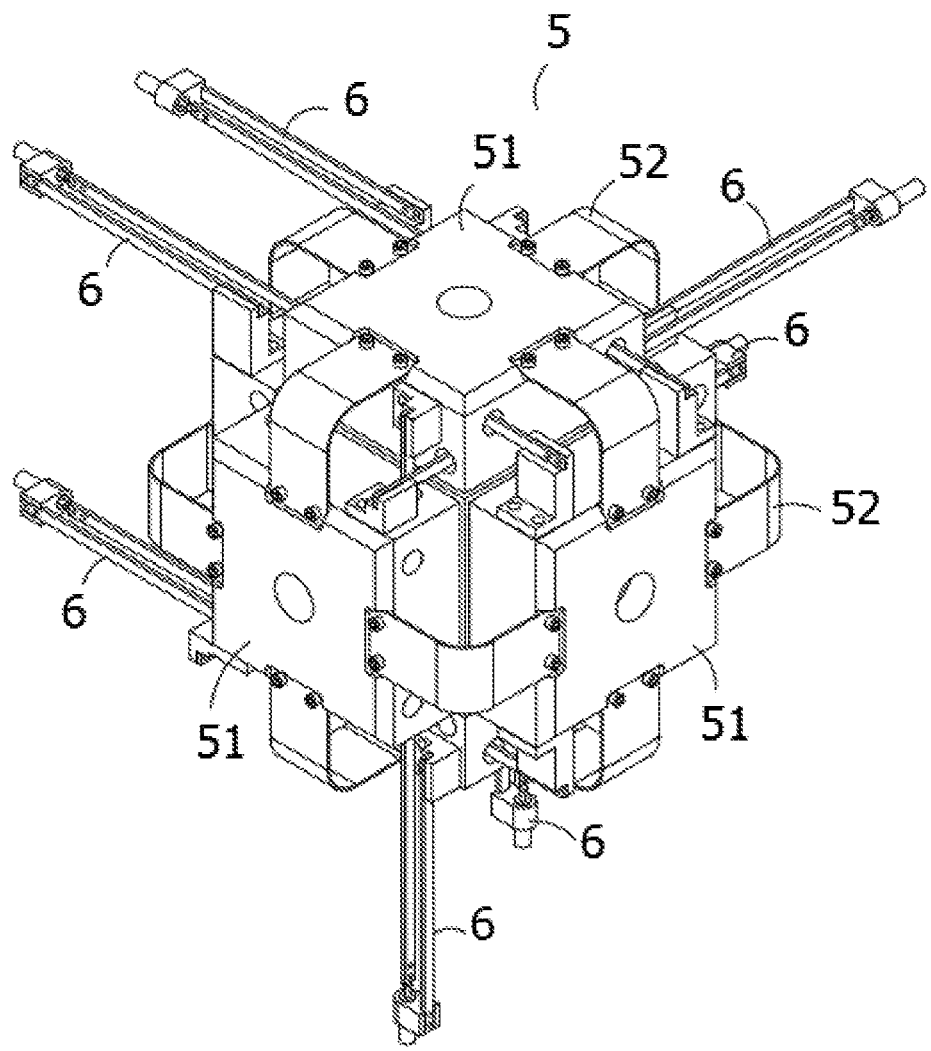
FIG. 16 is a three-dimensional view of an elastic pressure box according to Embodiment 1 when a displacement detection mechanism is provided between each pair of indenters.
Figure 17:
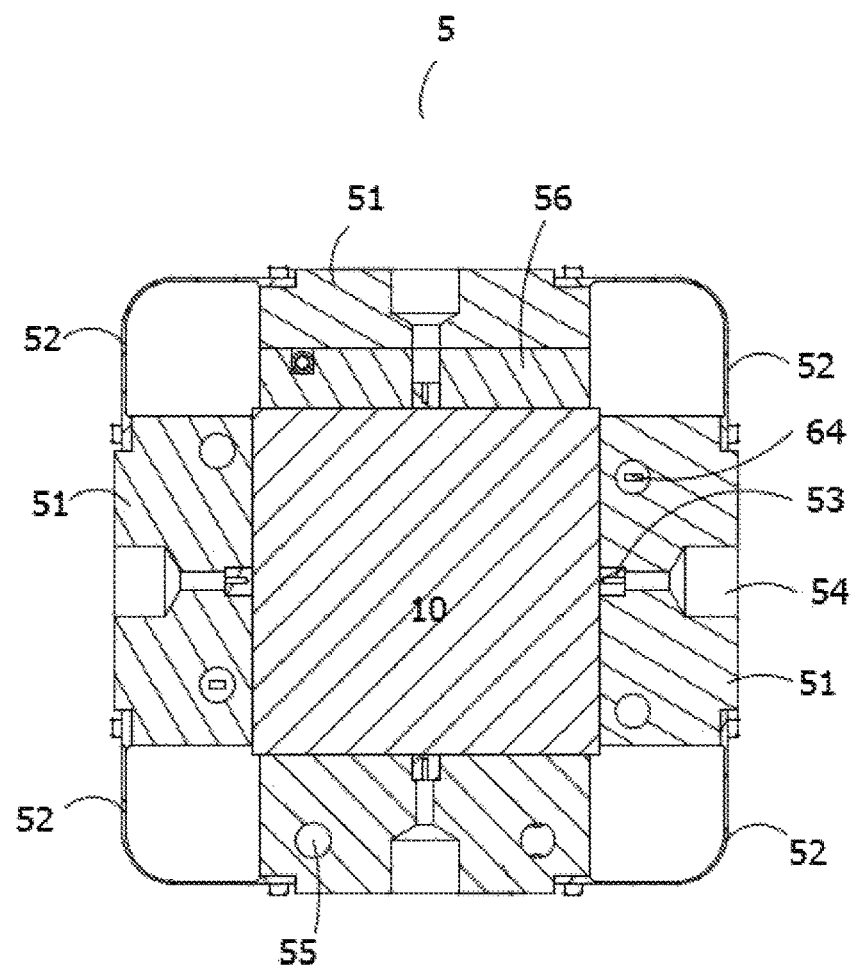
FIG. 17 is a cross-sectional view of an elastic pressure box according to Embodiment 1.

As shown in FIGS. 16 and 17, the elastic pressure box 5 comprises 6 indenters 51, and the 6 indenters 51 are respectively configured to butt with the 6 butting indenters 4.

In a possible design, at least 8 elastic pieces 52 are used to connect 6 indenters 51 together to form a sample space for placing the sample, and the sample 10 can be placed in the sample space. A number of the elastic pieces 52 is set reasonably based on a requirement. Particularly, taking 12 elastic pieces 52 to connect 6 indenters 51 together as an example, a periphery of each indenter 51 is connected to 4 indenters 51 on the periphery through one elastic piece 52. The 6 indenters 51 can be assembled together through the 12 elastic pieces 52, so that the indenters are tightly fixed and attached to the cubic sample.

Optionally, two ends of the elastic piece 52 are respectively connected to the two indenters 51 by screws. Optionally, the elastic piece 52 is a highly elastic metal piece.

The elastic pressure box 5 is operatively placed in an inner cavity of the cabin body 100, the inner ends of the butting indenters 4 on the cabin body 100 in 6 directions are respectively butted with the outer ends of the indenters 51 of the elastic pressure box 5 in 6 directions, the cubic sample 10 is operatively placed in the elastic pressure box 5, and the indenters 51 of the elastic pressure box 5 in 6 directions are respectively in contact with 6 faces of the sample 10. In the experiment, the indenter 51 is in contact with the faces of the sample and can uniformly transmit the pressure to the sample.

Optionally, a butting port 54 adapted to the butting indenter 4 is provided in a center of the indenter 51.

In a possible design, the indenter 51 has a rectangular shape, and a cubic sample can be placed in the elastic pressure box 5; and it should be noted that a size of the indenter 51 is set reasonably based on a requirement. Optionally, a cubic sample with a side length of 100 mm may be placed in the sample space.

In a possible design, a temperature sensor 50 and/or a heat flow sensor 55 resistant to high temperature and high pressure are/is arranged in a middle of the front end of each indenter 51, so that the real-time monitoring of the surface temperature of the sample in the experimental process and the measurement of the heat flow can be achieved.

Particularly, an integrated temperature and heat flow probe is embedded in a center hole of each indenter 51. A thermal conductive pad 53 is mounted at a front end of the center hole of the indenter 51, and the temperature of the sample is transmitted to the integrated temperature and heat flow probe in the center hole through the thermal conductive pad 53.

Figure 18:
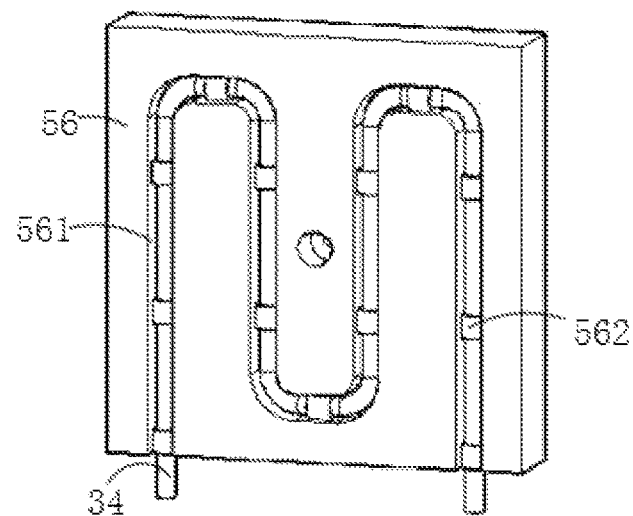
FIG. 18 is a three-dimensional view of a cushion block according to Embodiment 1.

In a possible design, as shown in FIG. 17, an electric heating element 34 is mounted at a front end of at least one indenter 51. Particularly, the electric heating element 34 is a resistive heating wire. As shown in FIG. 18, a serpentine groove 561 is formed on the back of a cushion block 56 for mounting a resistive heating wire, the resistive heating wire is fixed in the serpentine groove 561 by a plurality of ceramic rings 562 arranged at intervals, the indenter 51 is in contact with the back of the cushion block 56, and the cushion block 56 is rectangular and adapted to the indenter 51. The cushion block 56 is in contact with the faces of the sample and transfers heat evenly to the sample 10. The resistive heating wire sequentially passes through the ceramic rings 562, and the ceramic rings 562 are clamped in the serpentine groove 561, so that the resistive heating wire is prevented from being directly in contact with the cushion block 56, and local overheating is prevented.

Figure 19:
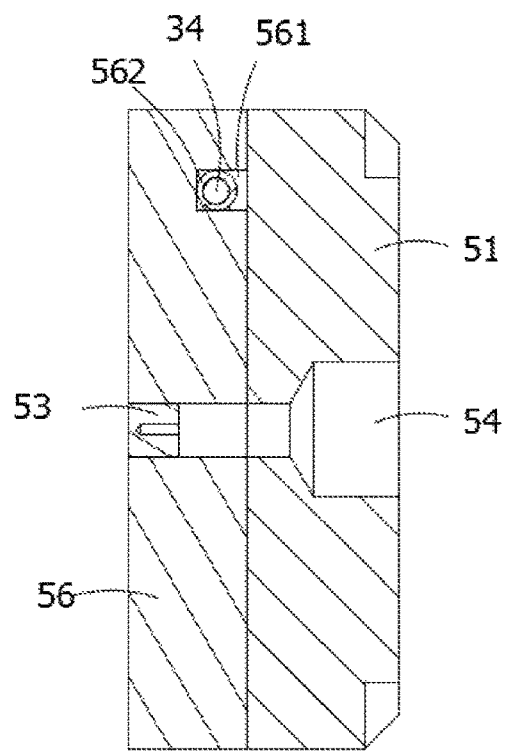
FIG. 19 is a cross-sectional view of a cushion block and an indenter according to Embodiment 1.

In a possible design, as shown in FIG. 19, a through hole is provided in a center of the cushion block 56, a thermal conductive pad 53 is mounted at a front end of the through hole, and the temperature of the sample is transmitted to the integrated temperature and heat flow probe in the center hole of the indenter 51 through the thermal conductive pad 53.

In a possible design, only the cushion block 56 is mounted at the front end of the indenter 51 above the Z axis, an upper part of the sample 10 can be uniformly heated based on a test requirement, the temperature can be between +10° C. and 600° C. at room temperature, and the temperature uniformity is 5° C. It should be noted that a thickness of the indenter 51 provided with the cushion block 56 at the front end is less than that of the remaining indenters 51, so that a total thickness of the indenter on which the cushion block 56 is mounted is equivalent to that the remaining indenters 51.

In a possible design, as shown in FIG. 6, the front ends of the six indenters 51 are each mounted with electric heating elements 34 and cushion blocks 56. Therefore, the cushion blocks 56 in 6 directions are in contact with the sample 10, and the high-efficiency uniform transmission of pressure and temperature is achieved.

In a possible design, the indenter 51 is entirely made of high-stiffness alloy material and has sufficient stiffness to meet 12 GN/m. The cushion block 56 is made of a high-rigidity alloy material. Optionally, the cushion block 56 and a surface of the indenter 51 may be aligned by providing a clamping groove.

In a possible design, as shown in FIG. 16, at least one displacement detection mechanism 6 is provided between two indenters 51 in the X-axis direction, between two indenters 51 in the Y-axis direction and between two indenters 51 in the Z-axis direction, so that the sample 10 can be monitored for deformation in the X, Y and Z directions.

Figure 20:
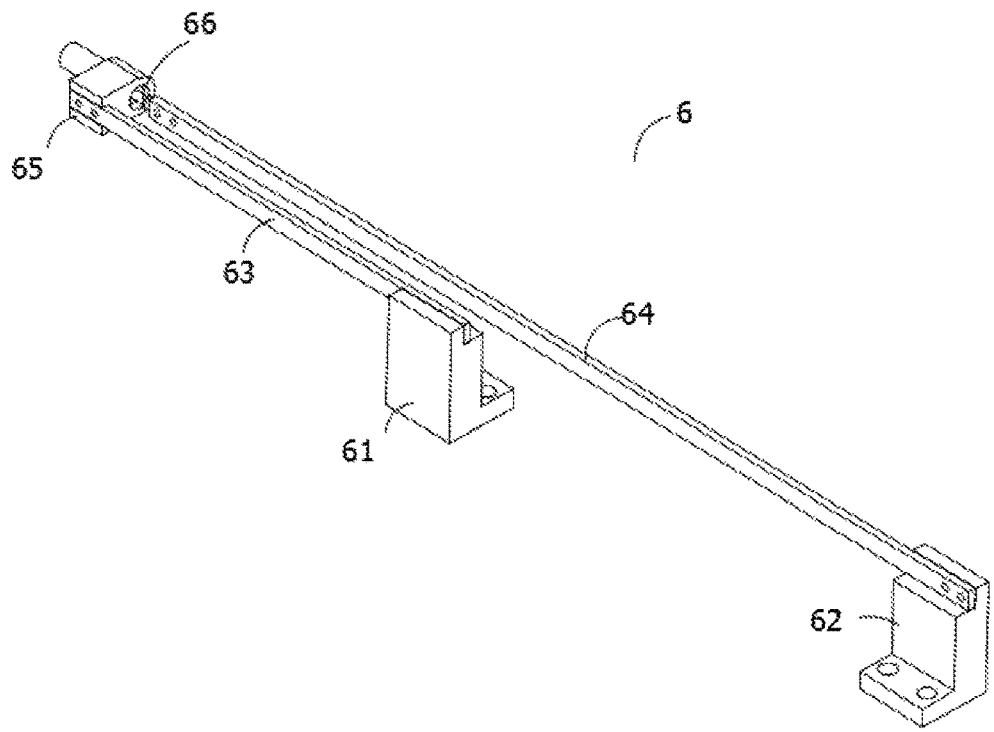
FIG. 20 is a three-dimensional view of a displacement detection mechanism according to Embodiment 1.

In a possible design, as shown in FIG. 20, the displacement detection mechanism 6 comprises a first connection seat 61, a second connection seat 62, a first lead-out rod 63, a second lead-out straight rod 64, a sensor mounting seat 65 and a second displacement sensor 66, the first lead-out rod 63 is parallel to the second lead-out straight rod 64, one end of the first lead-out rod 63 is fixedly connected to the first connection seat 61, one end of the second lead-out straight rod 64 is fixedly connected to the second connection seat 62, the other end of the first lead-out rod 63 is connected to the sensor mounting seat 65, the second displacement sensor 66 is mounted on the sensor mounting seat 65, the other end of the second lead-out straight rod 64 is adapted to a detection end of the second displacement sensor 66, the other end of the second lead-out straight rod is or is not connected to a detection end of the second displacement sensor, and the first connection seat 61 and the second connection seat 62 are respectively mounted on two indenters 51 on the same axis through screws. When the sample 10 deforms, the two indenters 51 on the same axis make relative displacement to drive the first lead-out rod 63 and the second lead-out straight rod 64 to make relative displacement, so that the sensor mounting seat 65 and the second lead-out straight rod 64 make relative displacement, the second displacement sensor 66 adapted to the sensor mounting seat can detect the displacement, and deformation monitoring is achieved.

If the second displacement sensor 66 is a contact sensor, the second displacement sensor 66 is connected or in contact with the other end of the second outgoing linear rod 64; if the second displacement sensor 66 is a non-contact sensor, the second displacement sensor 66 faces the other end of the second lead-out straight rod 64, and may or may not be in contact with the second lead-out straight rod. The first connection seat 61 and the second connection seat 62 are mounted on a side part of the indenter 51. Particularly, in order to facilitate the first lead-out rod 63 and the second lead-out straight rod 64 to pass through, the indenters 51 at corresponding positions are provided with lead-out rod holes. Taking the first lead-out rod 63 and the second lead-out straight rod 64 connected to the indenter 51 in the X-axis direction as an example, the first lead-out rod 63 and the second lead-out straight rod 64 are parallel to the X-axis direction, and the first lead-out rod 63 and the second lead-out straight rod 64 in the X-axis direction pass through the lead-out rod hole of the indenter 51 in the Y-axis direction.

In a possible design, the second displacement sensor 66 is an LVDT sensor.

The first lead-out rod 63 can not only achieve the mounting and fixation of the second displacement sensor 66, but also lead out the second displacement sensor 66 to the outside of the cabin body 100, thereby not only achieving the monitoring of the displacement in a high-temperature environment, but also avoiding the influence of the high-temperature environment inside the cabin body 100 on the second displacement sensor 66.

Optionally, two second displacement sensors 66 are provided between the two indenters 51 in the X-axis direction, and the two second displacement sensors 66 are mounted at diagonal positions of the two indenters 51, so as to achieve precise measurement of sample deformation in the X-axis direction. Two second displacement sensors 66 are provided between the two indenters 51 in the Y-axis direction, and the two second displacement sensors 66 are mounted at diagonal positions of the two indenters 51, so as to achieve precise measurement of sample deformation in the Y-axis direction. 3 second displacement sensors 66 are provided between the two indenters 51 in the Z-axis direction and are located at three angular positions of the two indenters 51, so that the precise measurement of the deformation of the sample in the Z-axis direction can be achieved.

This embodiment has a working principle as follows:

when in use, the cubic sample 10 is placed in the elastic pressure box 5, and the 6 indenters 51 are in contact with the six faces of the sample 10 respectively; an elastic pressure box 5 loaded with the sample 10 is operatively placed in an internal cavity of the cabin body 100, 6 butting indenters 4 are mounted on the cabin body 100, and inner ends of the butting indenters 4 on the cabin body 100 in 6 directions are respectively butted with outer ends of the 6 indenters 51;

the experimental cabin 2 is placed in a loading frame 13 of a three-axis six-direction loading system 1, and output ends of the hydraulic actuators of the loading frame 13 in six directions are respectively butted with the outer ends of 6 butting indenters 4;

based on an experimental requirement, if a high-temperature environment is required, the electric heating element 34 on the wall plate 32 is started to heat the whole cavity, and the environment temperature is constructed; and the 6 hydraulic actuators of the three-axis six-direction loading system 1 operate, and the axial force is uniformly transmitted to the sample 10 through the butting indenters 4 and the indenters 51, so that true triaxial stress preloading is achieved.

The three-axis six-direction loading system 1 according to the present application has control methods such as force and displacement, can achieve independent work and linkage coordination work of six pressure cylinders, can achieve three-axis six-direction precise linkage tracking in the loading and unloading process, and thus achieving centering synchronous control. According to the present application, smooth transition among force loading, displacement loading and control can be achieved, and data such as stress, displacement, strain and the like can be precisely recorded in real time. The stress and the strain can be monitored through a strain gauge, the strain gauge can be welded at an end part of the indenter, and the force applied by the hydraulic actuator can be monitored through the strain gauge.

Embodiment 2

Figure 21:
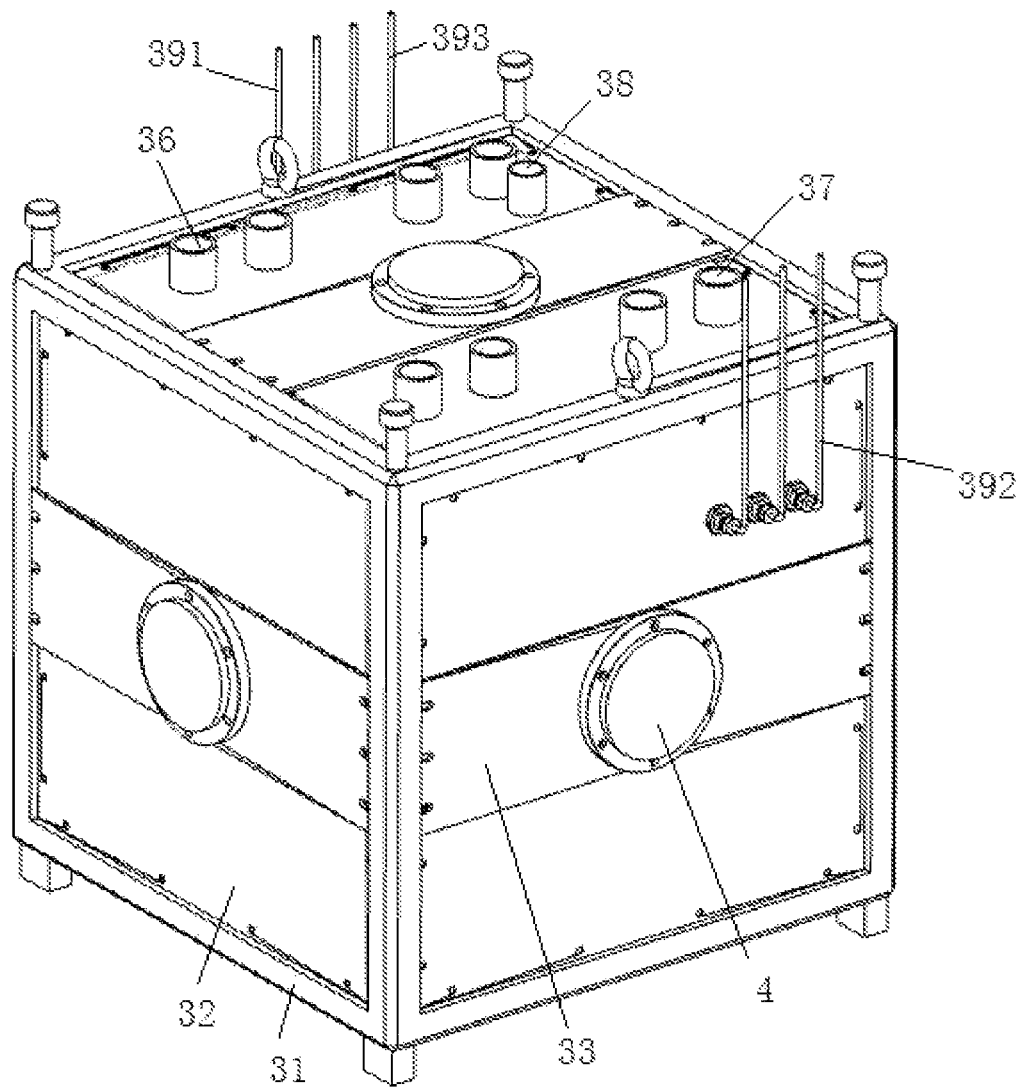
FIG. 21 is a three-dimensional view of an experimental cabin according to Embodiment 2.
Figure 22:
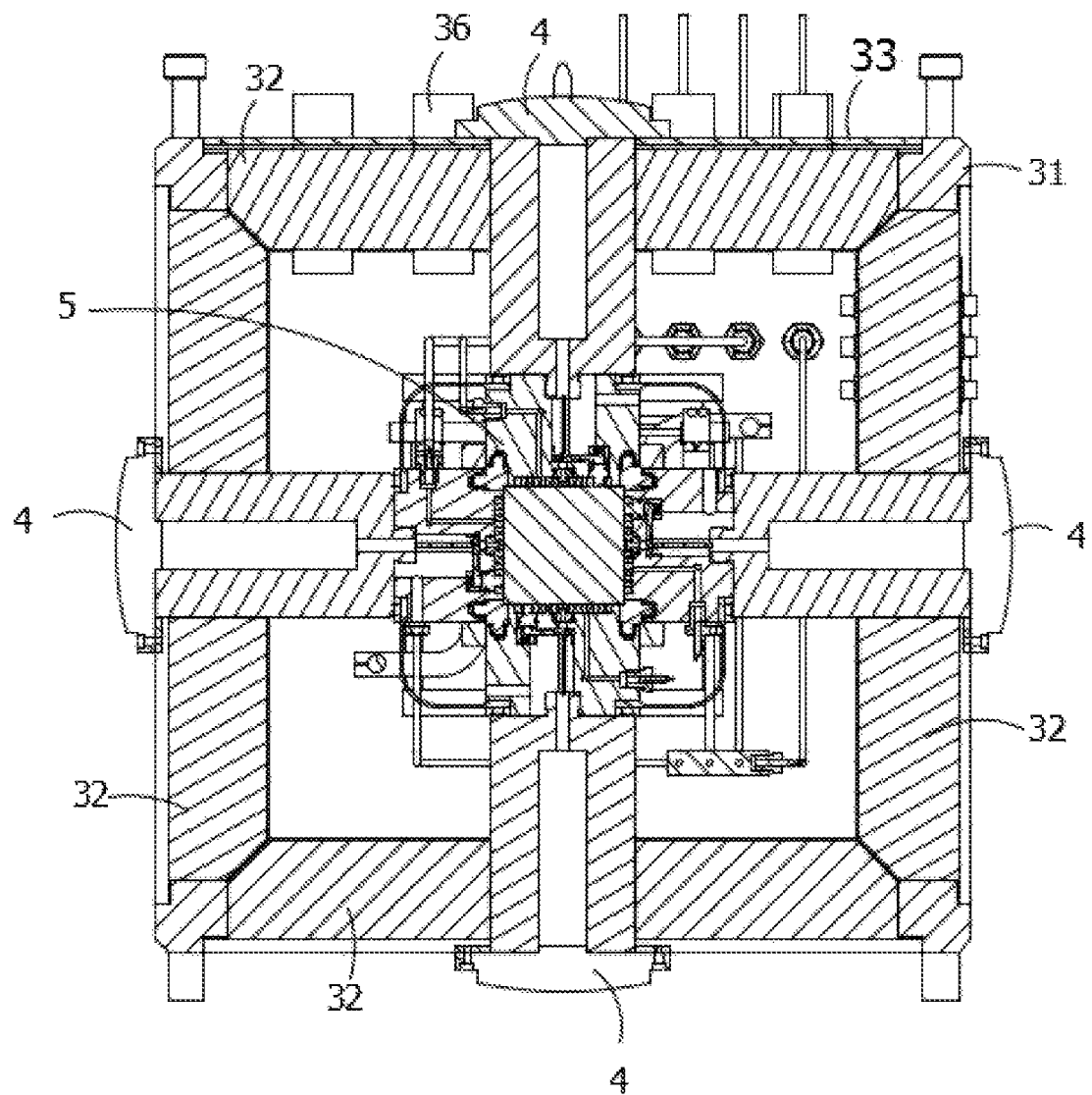
FIG. 22 is a cross-sectional view of an experimental cabin according to Embodiment 2.
Figure 23:
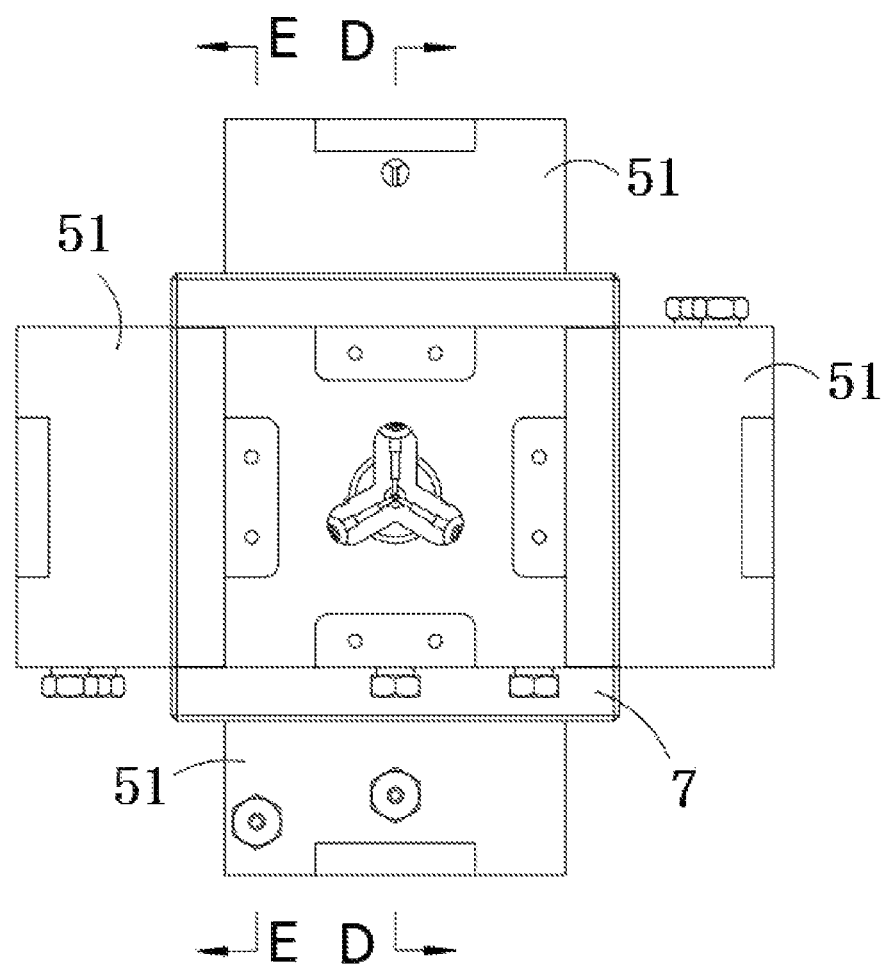
FIG. 23 is a front view of an experimental cabin according to Embodiment 2.
Figure 24:
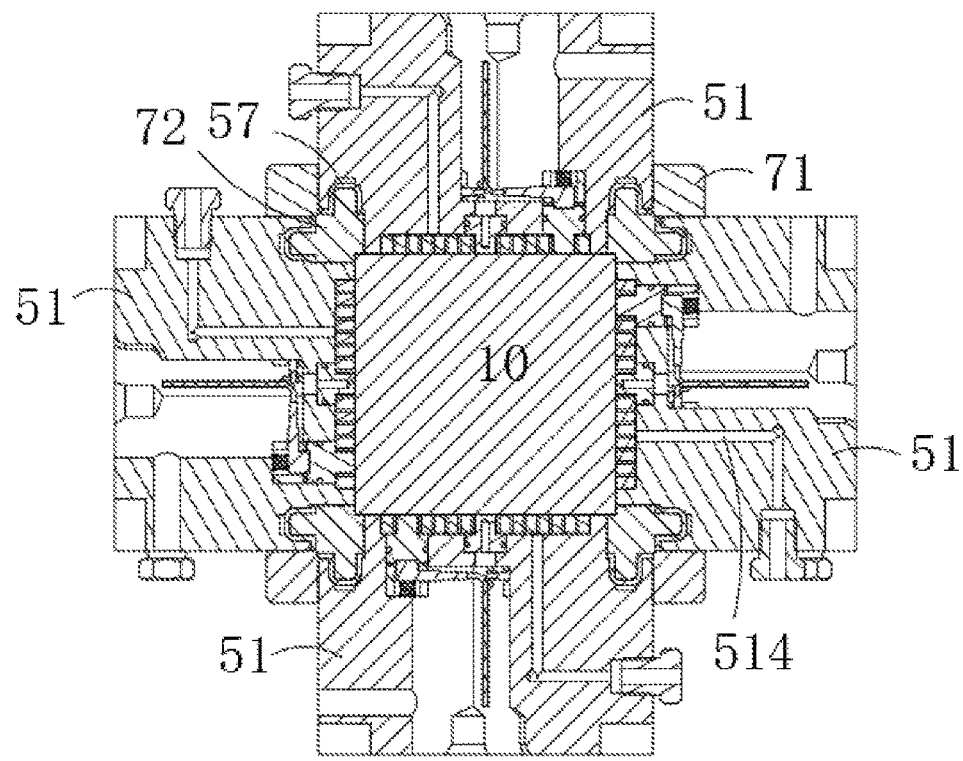
FIG. 24 is a cross-sectional view at D-D in FIG. 23.
Figure 25:
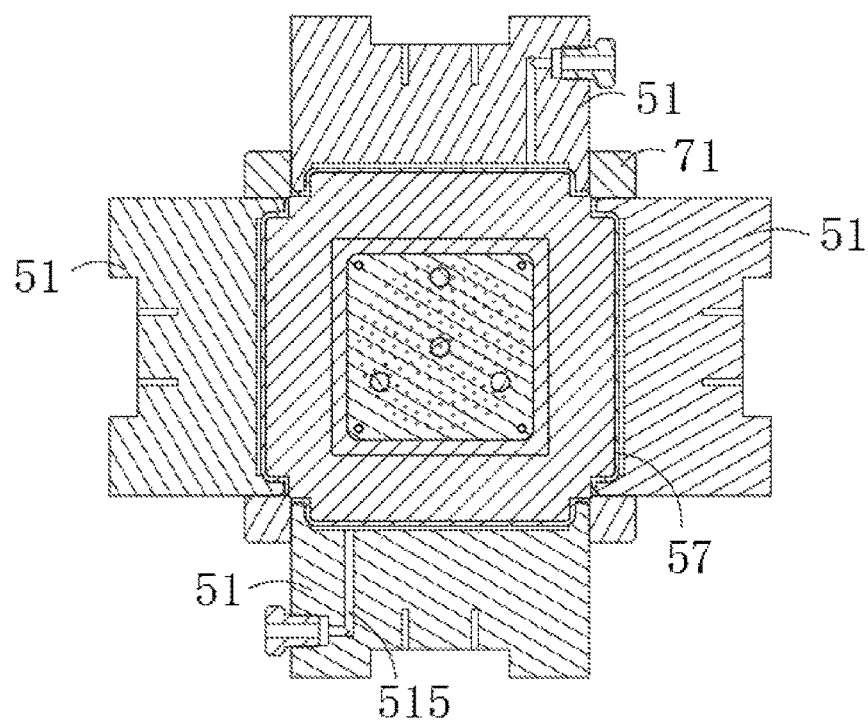
FIG. 25 is a cross-sectional view at E-E in FIG. 23.
Figure 26:
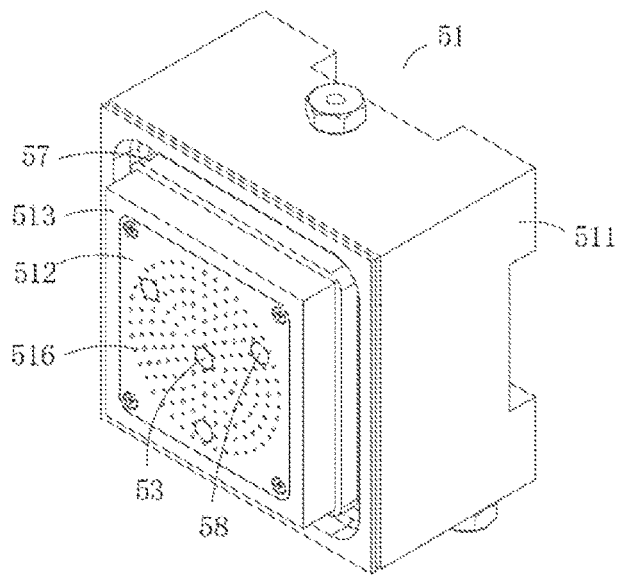
FIG. 26 is a three-dimensional view of an indenter according to Embodiment 2.

This embodiment is different from Embodiment 1 in that, as shown in FIGS. 21 and 22, this embodiment does not provide an electric heating element 34 on the wall plate of the cabin body 100, but instead provides an air inlet 36 and an air outlet 37, an air source is connected to the air inlet 36, air with different temperatures can be injected into the cabin body 100 to control the internal temperature, and the injected air is sent out from the air outlet 37. For example, the air inlet 36 is connected to a hot air source to inject hot air inside to heat the internal space.

It should be noted that a number of the air inlets 36 and the air outlets 37 is set reasonably based on a requirement. In a possible design, 4 air inlets 36 and 4 air outlets 37 are provided.

In a possible design, the air inlet 36 and the air outlet 37 are arranged on the same face of the cabin body 100. Particularly, a row of air inlets 36 and a row of air outlets 37 are respectively arranged on two sides of a wall plate 32 of a top of the cabin body 100.

In a possible design, the outer wall of the cabin body 100 is provided with a cold source port 38, the cold source port 38 is connected to a cold source, and the cold source can be injected into the cabin body 100, so that the internal temperature can be controlled. For example, the internal space can be cooled by injecting liquid nitrogen into the cabin body 100 through the cold source port 38 by using a liquid nitrogen supply system; and a part of the injected liquid nitrogen becomes gas and may be discharged from the air inlet 36 and the air outlet 37.

In a possible design, the air inlet 36, the air outlet 37 and the cold source port 38 are all arranged at the wall plate 32 of the top of the cabin body 100.

In a possible design, as shown in FIGS. 23 to 27, the indenter 51 comprises an indenter body 511 and a permeation block 512. A front end of the indenter body 511 is provided with an annular sealing groove 517 and a rectangular convex block 513, the annular sealing groove 517 is located at an edge of the front end of the indenter body 511, the rectangular convex block 513 is located on an inner periphery of the annular sealing groove 517, and a circumferential sealing strip 57 is embedded in the annular sealing groove 517. The annular sealing groove 517 and the rectangular convex block 513 are manufactured integrally with the indenter body 511.

A percolation medium channel 514 and a sealing medium injection channel 515 are arranged in the indenter body 511, one end of the sealing medium injection channel 515 is communicated with the annular sealing groove 517, and the other end of the sealing medium injection channel passes through an outer surface of the indenter body 511.

A front end face of the rectangular convex block 513 is provided with an integrally-manufactured embedding groove 518, the permeation block 512 is embedded in the embedding groove 518 through screws, a plurality of permeation holes 516 are uniformly distributed in the permeation block 512, and the permeation holes 516 are communicated with the permeation block 512 from front to back One end of the percolation medium channel 514 is communicated with the embedding groove 518, and the other end of the percolation medium channel is communicated with the outer surface of the indenter body 511. Percolation media with different temperatures and pressures can be injected through the percolation medium channel 514 according to experimental requirements, and the percolation media flow into the embedding groove 518 and then uniformly flow to the sample through a plurality of permeation holes 516. A high-pressure sealing medium can be injected into the annular sealing groove 517 through the sealing medium injection channel 515, so that percolation medium can be prevented from flowing out from an edge of the sample, which can be used for rock mass percolation testing.

In a possible design, the permeation block 512 is provided with a plurality of circles of permeation holes 516 that are equally spaced and concentric from inside to outside, and each circle is provided with a plurality of permeation holes 516 that are equally spaced along a circumferential direction.

Figure 27:
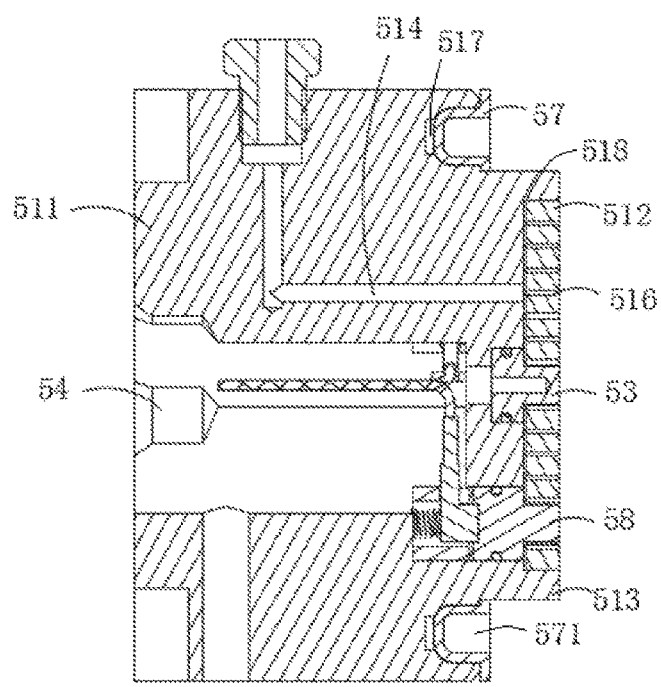
FIG. 27 is a cross-sectional view of an indenter according to Embodiment 2 in a first section.
Figure 28:
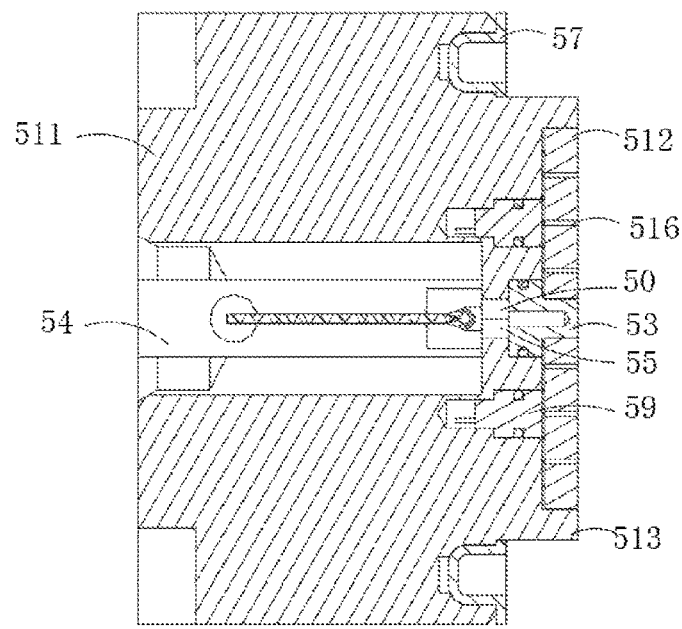
FIG. 28 is a cross-sectional view of an indenter according to Embodiment 2 in a second section.

In a possible design, as shown in FIGS. 27 and 28, the front end of the indenter 51 is provided with an acoustic emission probe 58 and/or an ultrasonic probe 59.

Figure 3:
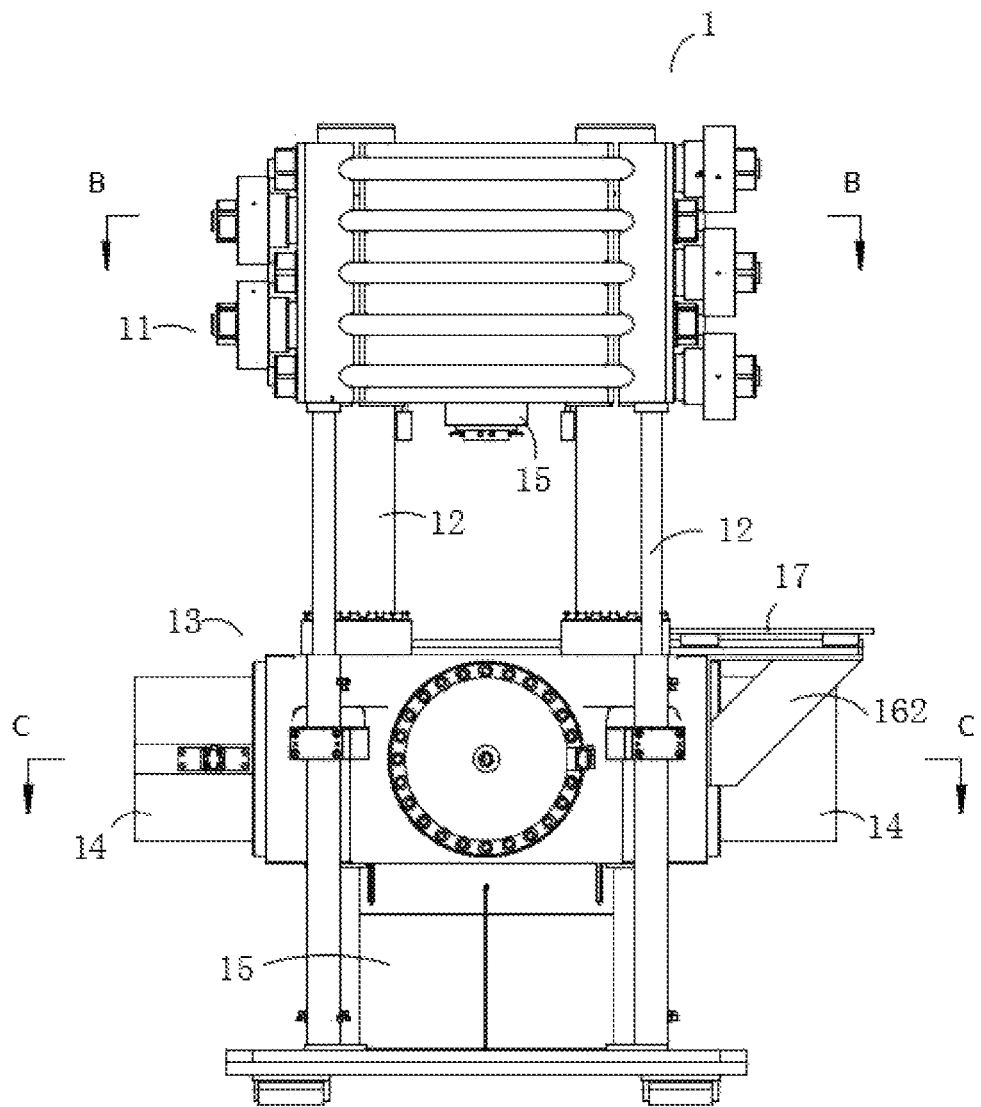
FIG. 3 is a front view of a three-axis six-direction loading system according to an embodiment.

In a possible design, as shown in FIGS. 3 to 5, the front end of the indenter 51 is provided with an acoustic emission probe mounting hole, the acoustic emission probe 58 is mounted in the acoustic emission probe mounting hole, and a sealing ring is provided between the acoustic emission probe 58 and a hole wall of the indenter 51. Particularly, the front end of the indenter 51 is provided with three acoustic emission probes 58, and the three acoustic emission probes 58 are arranged at equal intervals in the circumferential direction around a center of the indenter 51.

In a possible design, the indenter 51 is provided with two ultrasonic probes 59 that are resistant to high temperature and high pressure, one of which is a P-wave and the other is an S-wave. The front end of the indenter 51 is provided with an ultrasonic probe mounting hole, an ultrasonic probe 59 is mounted in the ultrasonic probe mounting hole, and a sealing ring is arranged between the ultrasonic probe 59 and a hole wall of the indenter 51.

In a possible design, the front end of each indenter 51 is provided with 3 sets of high-temperature and high-pressure acoustic emission probes with a frequency of 20-1200 kHz and a sampling frequency of 10 Hz, and real-time monitoring of microseismic signals in the rock mass fracture process can be achieved. Optionally, 2 sets of high-temperature and high-pressure acoustic emission probes integrate one P wave and one S wave respectively for ultrasonic detection function, which can achieve real-time monitoring of ultrasonic waves during the experiment.

In a possible design, the sealing medium injection channel 515 and the percolation medium channel 514 are L-shaped, and the other ends thereof vertically pass through a sidewall of the indenter body 511. Optionally, the entire indenter body 511 is made of a high-rigidity alloy material, and the permeation block 512 also has high rigidity.

Figure 30:
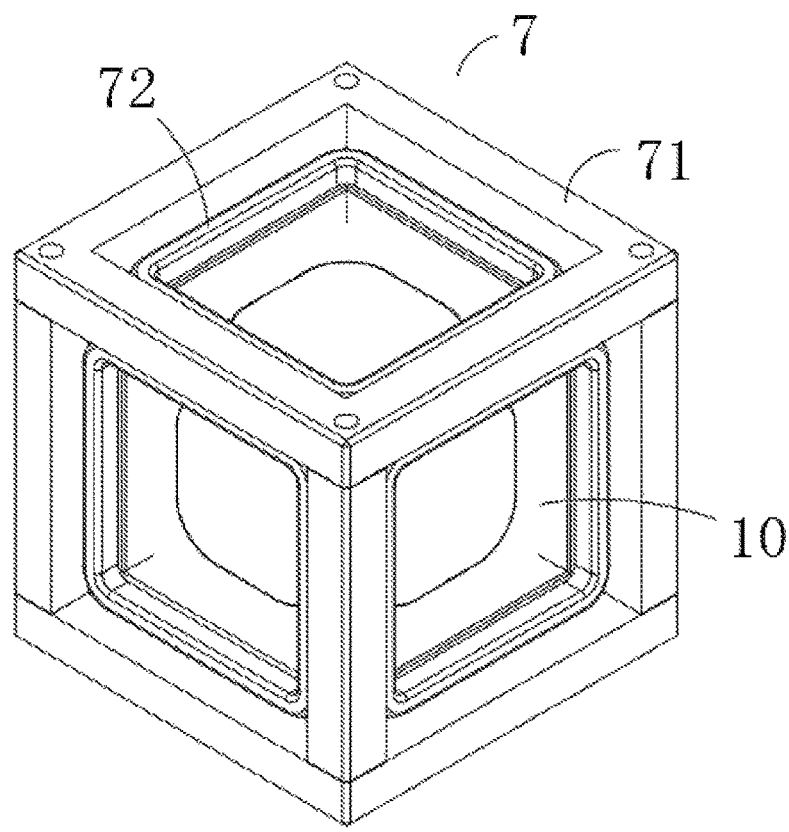
FIG. 30 is a three-dimensional view of a sample holder according to Embodiment 2.
Figure 31:
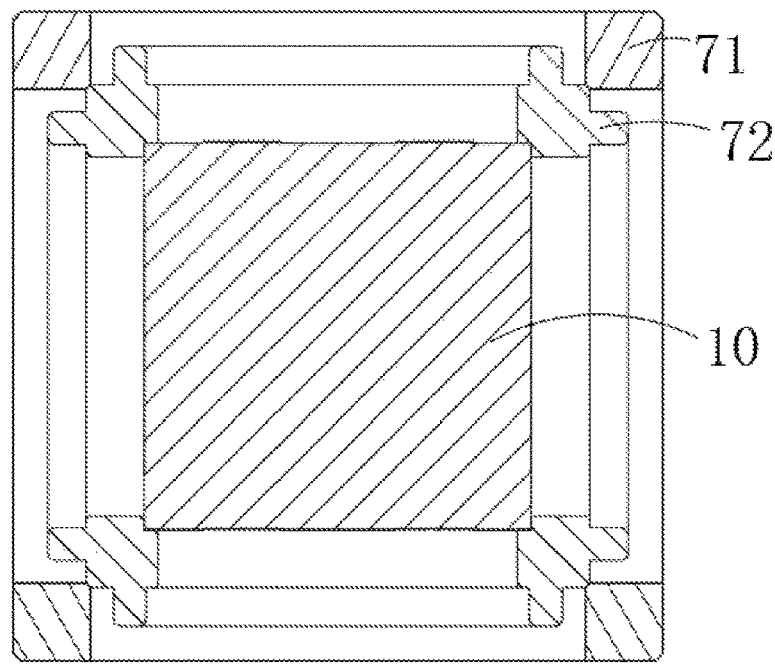
FIG. 31 is a cross-sectional view of a sample holder according to Embodiment 2.

In a possible design, the experimental cabin in this embodiment further comprises a sample holder 7. As shown in FIGS. 30 and 31, the sample holder 7 is used to fix a cubic sample 10; meanwhile, openings adapted to 6 indenters 51 need to be reserved in 6 directions.

In a possible design, the sample holder 7 comprises a rigid outer cubic frame 71 and a flexible inner cubic frame 72, the rigid outer cubic frame 71 and the flexible inner cubic frame 72 are both provided with 12 frame edges 721, and 6 faces of the rigid outer cubic frame 71 and 6 faces of the flexible inner cubic frame 72 are both rectangular frames.

The sample 10 may be loaded in the flexible inner cubic frame 72. The 12 outside corner positions 723 of the flexible inner cubic frame 72 are attached to 12 inside corners of the rigid outer cubic frame 71.

In a possible design, the 12 inside corner positions of the flexible inner cubic frame 72 have right-angled edge structures 724 that are adapted to corners of the sample 10.

Optionally, the flexible inner cubic frame 72 is made of a wear-resistant, pressure-resistant and high-strength rubber frame, and the rigid outer cubic frame 71 is a metal frame.

Figure 32:
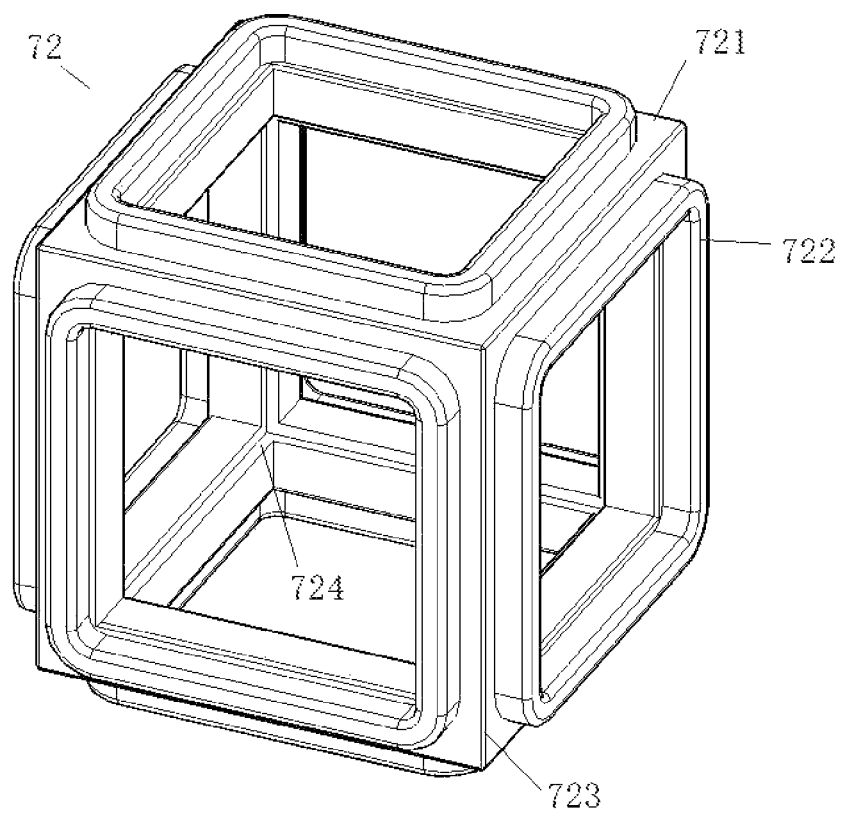
FIG. 32 is a three-dimensional view of a flexible inner cubic frame according to Embodiment 2.
Figure 33:
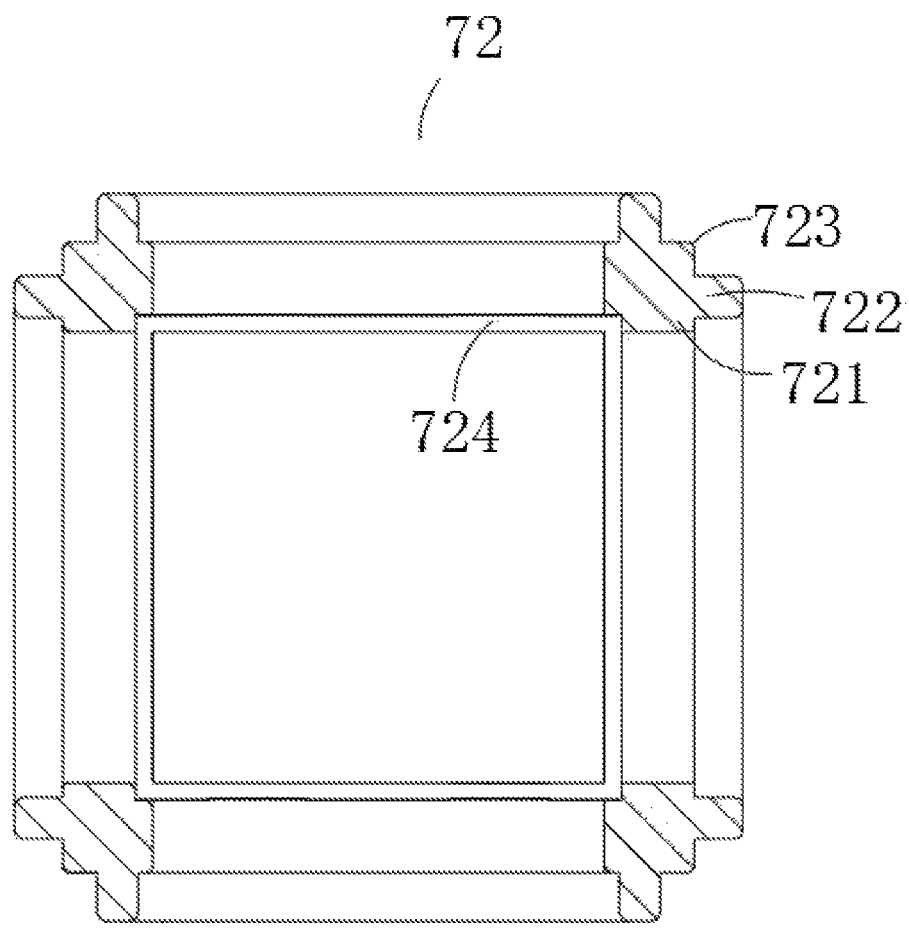
FIG. 33 is a cross-sectional view of a flexible inner cubic frame according to Embodiment 2.

In a possible design, as shown in FIGS. 32 and 33, each face of the flexible inner cubic frame 72 is provided with an integrally-manufactured annular flange 722, and the annular flange 722 is adapted to the annular sealing groove of the indenter body 511. As shown in FIG. 27, the circumferential sealing strip 57 is provided with an annular groove 571 that is adapted to the annular flange 722, and the annular flange 722 can be fitted in the annular groove 571 of the circumferential sealing strip 57. Optionally, a cross section of the circumferential sealing strip 57 is a U-shaped structure with an opening facing outward. Particularly, the circumferential sealing strip 57 is made of high-strength rubber.

In a possible design, the indenter 51 is adapted to a rectangular frame opening of the rigid outer cubic frame 71, and the two may be kept relatively fixed by friction. A rectangular convex block 513 is adapted to a rectangular frame opening of the flexible inner cubic frame 72.

In a possible design, the cabin body 100 is provided with three percolation inlet pipes 391, three percolation outlet pipes 392 and a sealing main pipe 393, wherein the three percolation inlet pipes 391 are respectively connected to the percolation medium channels 514 of one of the indenters 51 in the X-axis direction, one of the indenters 51 in the Y-axis direction and one of the indenters 51 in the Z-axis direction, and the three percolation outlet pipes 392 are respectively connected to the percolation medium channels 514 of the other indenter 51 in the X-axis direction, the other indenter 51 in the Y-axis direction and the other indenter 51 in the Z-axis direction. Fluid with different temperatures and pressures can be injected through the percolation medium channel 514 according to experiment requirements, and the fluid can uniformly flow to the sample 10 through the permeation holes 516.

The sealing main pipe 393 is connected to the sealing medium injection channels 515 of the 6 indenters 51 through 6 sealing branches. The sealing medium can be injected into the annular sealing groove 517 of the indenter 51 through the sealing medium injection channel 515, and the percolation medium can be prevented from flowing out from the edge of the sample 10.

Figure 29:
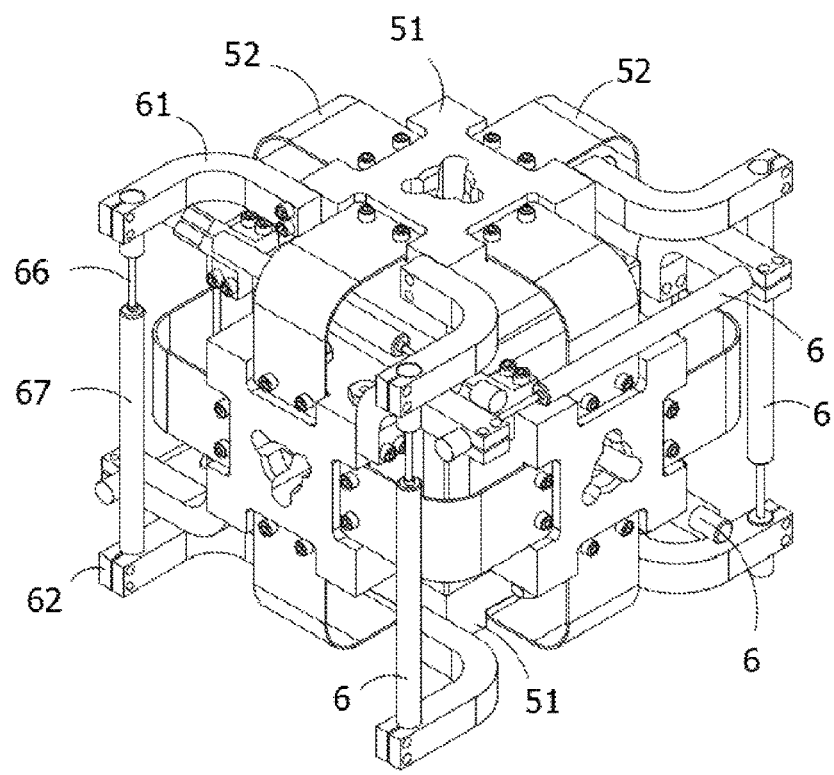
FIG. 29 is a three-dimensional view of an elastic pressure box according to Embodiment 2 when a displacement detection mechanism is provided between each pair of indenters.

In a possible design, as shown in FIG. 29, the displacement detection mechanism 6 comprises a first connection seat 61, a second connection seat 62, a second displacement sensor 66 and an extensometer rod 67, the first connection seat 61 and the second connection seat 62 are respectively fixed on side parts of the two indenters 51 in the same axial direction, one end of the second displacement sensor 66 is connected to the first connection seat 61, one end of the extensometer rod 67 is connected to the second connection seat 62, and the other end of the second displacement sensor 66 is connected or in contact with the other end of the extensometer rod 67. When the sample 10 is deformed, the two indenters 51 move toward each other, and the extensometer rod 67 pushes the second displacement sensor 66 to contract, so that the deformation amount of the sample 10 is detected by the second displacement sensor 66.

Figure 34:
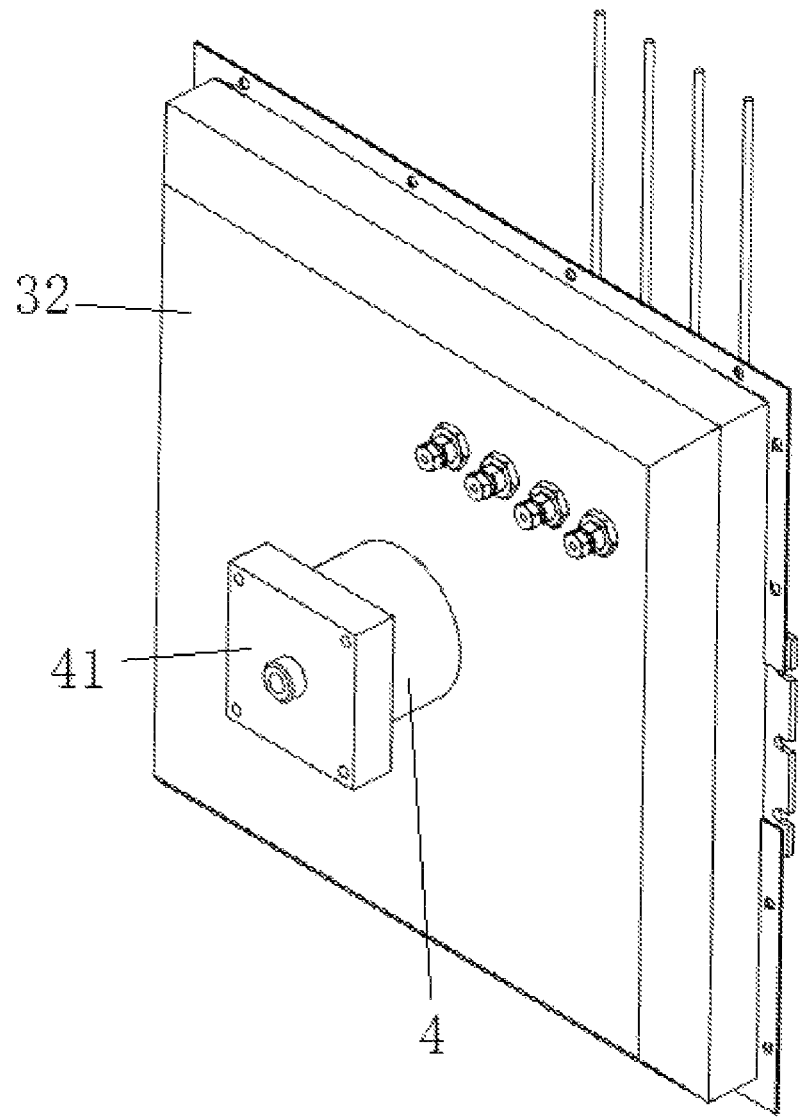
FIG. 34 is a three-dimensional view showing a butting indenter mounted with a heating plate is mounted on a panel according to Embodiment 2.

In a possible design, as shown in FIG. 34, a heating plate 41 is mounted at a front end of at least one of the butting indenters 4, and an electric heating rod is mounted in the heating plate 41.

In a possible design, a heating plate 41 is provided at a front end of only one butting indenter 4, which is used to generate opposing temperature differential.

In a possible design, a heating plate 41 is mounted at a front end of each butting indenter 4.

This embodiment has a working principle as follows:

In use, a 100×100×100 mm sample 10 is placed within the flexible inner cubic frame 72, wherein 12 outside corner positions 723 of the flexible inner cubic frame 72 are attached to 12 inside corners of the rigid outer cubic frame 71;

6 indenters 51 respectively pass through frame openings of the rigid outer cubic frame 71 and the flexible inner cubic frame 72 in 6 directions, and annular flanges 722 on 6 faces of the flexible inner cubic frame 72 are correspondingly loaded in annular grooves of circumferential sealing strips 57 of the 6 indenters 51;

an elastic pressure box 5 loaded with the sample 10 is operatively placed in an internal cavity of the cabin body 100, 6 butting indenters 4 are mounted on the cabin body 100, and inner ends of the butting indenters 4 on the cabin body 100 in 6 directions are respectively butted with outer ends of the 6 indenters 51;

the experimental cabin 2 is placed in a loading frame 13 of a three-axis six-direction loading system 1, and output ends of the hydraulic actuators of the loading frame 13 in six directions are respectively butted with the outer ends of 6 butting indenters 4;

according to an experiment requirement, if a high-temperature environment is required, hot air is sent into the cabin body 100 to heat the sample 10 inside; if a low-temperature environment is required, liquid nitrogen is injected into the cabin body 100 through the cold source port 38 to cool the sample 10 inside;

the 6 hydraulic actuators operate, and the axial force is uniformly transmitted to the sample 10 through the butting indenters 4 and the indenters 51, so that true triaxial stress preloading is achieved;

the sealing main pipe 393 is connected to a high-pressure plunger pump, and a sealing medium is injected into the sealing medium injection channels 515 of the 6 indenters 51 through the high-pressure plunger pump, so that 12 edges of the sample 10 are tightly attached to the flexible inner cubic frame 72, and a three-way sealing effect is achieved; and the percolation medium is injected through the three percolation inlet pipes 391, the percolation medium flowing through the sample 10 finally flows out through the three percolation outlet pipes 392, and outlets of the three percolation outlet pipes 392 are provided with flow meters, which can achieve three-way synchronous percolation tests.

The present application is provided with multiple measuring channels, can acquire deformation and acoustic emission, and can achieve three-way multi-parameter synchronous monitoring and acquisition of acoustic emission, ultrasonic wave, temperature field, percolation field and heat flow field.

The objectives, technical solutions and beneficial effects of the present application are further explained in detail with reference to the specific implementations described above, and it should be understood that the above-mentioned contents are merely specific implementations of the present invention, and are not intended to limit the protection scope of the present invention. Any modification, equivalent substitution, improvement and the like made within the spirit and principle of the present invention shall all fall within the protection scope of the present invention.

What is claimed is:

1. A rock physico-mechanical testing system in simulated environments of deep earth, deep space, and deep sea, comprising: a three-axis six-direction loading system (1), an experimental cabin (2) and an elastic pressure box (5);

wherein the three-axis six-direction loading system (1) comprises a loading frame (13) and a true triaxial stress loading mechanism, and the true triaxial stress loading mechanism comprises two horizontal actuators (14) in an X-axis direction, two horizontal actuators (14) in a Y-axis direction and two vertical actuators (15) in a Z-axis direction;

the loading frame (13) is internally provided with an experimental cabin accommodation chamber (130), the experimental cabin accommodation chamber (130) is provided with a loading port in each of upper, lower, left, right, front and rear directions, the loading port is communicated with the experimental cabin accommodation chamber (130), and the six actuators are each adapted to one of the loading ports;

the experimental cabin (2) comprises a cabin body and 6 butting indenters (4), the 6 butting indenters (4) are pairwise located in an X-axis direction, a Y-axis direction and a Z-axis direction, the 6 butting indenters (4) are respectively mounted in through holes of the cabin body in six directions and can move axially relative to the cabin body, inner ends of the butting indenters (4) extend into the cabin body, and the outer ends of the butting indenters are exposed out of the cabin body;

the experimental cabin (2) is operatively placed in the experimental cabin accommodation chamber (130), and front ends of the six actuators each are operatively butted with a rear end of one of the butting indenters (4);

the elastic pressure box (5) comprises 6 indenters (51), and the 6 indenters (51) are pairwise located in the X-axis direction, the Y-axis direction and the Z-axis direction and form a space for placing a sample (10) in the elastic pressure box;

the elastic pressure box (5) is operatively placed in the cabin body, and front ends of the 6 butting indenters (4) are each butted with a rear end of one of the indenters (51);

the indenter (51) comprises an indenter body (511) and a permeation block (512), a front end of the indenter body (511) is provided with an annular sealing groove and a rectangular convex block (513), the annular sealing groove is located at an edge of the front end of the indenter body (511), the rectangular convex block (513) is located on an inner periphery of the annular sealing groove, and a circumferential sealing strip is embedded in the annular sealing groove (57);

a percolation medium channel (514) and a sealing medium injection channel (515) are arranged in the indenter body (511), one end of the sealing medium injection channel (515) is communicated with the annular sealing groove, and the other end of the sealing medium injection channel passes through an outer surface of the indenter body (511); and a front end face of the rectangular convex block (513) is provided with an integrally-manufactured embedding groove, the permeation block (512) is embedded in the embedding groove, a plurality of permeation holes (516) are uniformly distributed in the permeation block (512), the permeation holes (516) are communicated with the permeation block (512) from front to back, one end of the percolation medium channel (514) is communicated with the embedding groove, and the other end of the percolation medium channel is communicated with the outer surface of the indenter body (511).

2. The rock physico-mechanical testing system in simulated environments of deep earth, deep space, and deep sea according to claim 1, wherein the three-axis six-direction loading system (1) further comprises a beam assembly (11) and a beam moving mechanism, the beam assembly (11) comprises a moving beam (111), a plurality of vertically arranged bearing columns (112) and a beam locking mechanism;

the moving beam (111) is mounted on the plurality of bearing columns (112), the beam moving mechanism is configured to achieve an up-and-down movement of the moving beam (111) along the plurality of bearing columns (112), the beam locking mechanism may fix the moving beam (111) and the plurality of bearing columns (112), and the upper vertical actuator (15) is mounted in a center of the moving beam (111);

the loading frame (13) comprises an integrally-manufactured loading frame beam (131), a lower end of a bearing column (112) is fixedly connected to the loading frame beam (131), the experimental cabin accommodation chamber (130) is arranged in a center of the loading frame beam (131), and 6 loading ports are respectively located on six faces of the loading frame beam (131); the lower vertical actuator (15) and the 4 horizontal actuators (14) are separately mounted on the loading frame beam (131); and the beam moving mechanism comprises a plurality of lift hydraulic cylinders (12), and the plurality of lift hydraulic cylinders (12) are supported between the moving beam (111) and the loading frame beam (131).

3. The rock physico-mechanical testing system in simulated environments of deep earth, deep space, and deep sea according to claim 2, wherein 4 bearing columns (112) are provided, four clamping openings (1111) adapted to the bearing columns (112) are formed in the moving beam (111), and the bearing columns (112) are mounted in the clamping openings (1111); and the beam locking mechanism comprises two sets of clamping hydraulic cylinders (113), an extended clamping arm (1112) is arranged outside each clamping opening (1111), the clamping arms (1112) and the moving beam (111) are integrally manufactured, and the clamping arms (1112) of every two clamping openings (1111) are tensioned through one set of clamping hydraulic cylinders (113) so as to simultaneously clamp and fix two corresponding bearing columns (112) and the moving beam (111).

4. The rock physico-mechanical testing system in simulated environments of deep earth, deep space, and deep sea according to claim 1, wherein the cabin body comprises an outer cubic frame (31) and 6 wall plates (32), and the 6 wall plates (32) are respectively mounted in 6 directions of the outer cubic frame (31); and an outer side of each wall plate (32) is provided with an elastic plate (33), two ends of the elastic plate (33) are movably connected to the outer cubic frame (31), coaxial through holes are formed in the elastic plate (33) and the wall plate (32), the butting indenters (4) are mounted in the through holes, and the butting indenters (4) are fixedly connected to the elastic plate (33).

5. The rock physico-mechanical testing system in simulated environments of deep earth, deep space, and deep sea according to claim 4, wherein the 6 wall plates (32) each are provided with an electric heating element (34).

6. The rock physico-mechanical testing system in simulated environments of deep earth, deep space, and deep sea according to claim 1, wherein a heating plate (41) is mounted at a front end of at least one of the butting indenters (4), and an electric heating element (34) is mounted in the heating plate (41).

7. The rock physico-mechanical testing system in simulated environments of deep earth, deep space, and deep sea according to claim 1, wherein at least 8 elastic pieces (52) are used to connect 6 indenters (51) together;
   a displacement detection mechanism (6) is or is not provided between the two indenters (51) in the same axial direction;
   the front end of the indenter (51) is provided with or without a temperature sensor and/or a heat flow sensor; and
   the front end of the indenter (51) is provided with or without an acoustic emission probe (58) and/or an ultrasonic probe (59).

8. The rock physico-mechanical testing system in simulated environments of deep earth, deep space, and deep sea according to claim 1, further comprising: a sample holder (7), wherein the sample holder (7) comprises a rigid outer cubic frame (71) and a flexible inner cubic frame (72), the rigid outer cubic frame (71) and the flexible inner cubic frame (72) are both provided with 12 frame edges (721), 6 faces of the rigid outer cubic frame (71) and 6 faces of the flexible inner cubic frame (72) are both rectangular frames, and 12 outside corner 2 positions (723) of the flexible inner cubic frame (72) are attached to 12 inside corners of the rigid outer cubic frame (71);
   each face of the flexible inner cubic frame (72) is provided with an integrally-manufactured annular flange (722), and the annular flange (722) is adapted to an annular sealing groove of the circumferential sealing strip (57); and
   the sample (10) may be loaded in the flexible inner cubic frame (72), 6 indenters (51) are operatively and respectively pass through frame openings of the rigid outer cubic frame (71) and the flexible inner cubic frame (72) in 6 directions, and annular flanges (722) on 6 faces of the flexible inner cubic frame (72) are correspondingly loaded in annular grooves of circumferential sealing strips (57) of the 6 indenters (51).

9. The rock physico-mechanical testing system in simulated environments of deep earth, deep space, and deep sea according to claim 1, wherein the cabin body is provided with an air inlet (36), an air outlet (37) and a cold source port (38).

10. The rock physico-mechanical testing system in simulated environments of deep earth, deep space, and deep sea according to claim 1, wherein a heating plate (41) is mounted at a front end of at least one of the butting indenters (4).

11. The rock physico-mechanical testing system in simulated environments of deep earth, deep space, and deep sea according to claim 1, wherein the vertical actuator (15) and the horizontal actuator (14) both comprise a cylinder barrel (101), a piston (102) and an actuating indenter (103), the actuating indenter (103) is connected to a free end of the piston (102), and the actuating indenter (103) is adapted to the butting indenter (4); and a first displacement sensor (104) is arranged between the cylinder barrel (101) and the piston (102), and a force sensor (105) is arranged between the actuating indenter (103) and the piston (102).

\* \* \* \* \*